United States Patent
Byun et al.

(10) Patent No.: US 11,115,835 B2
(45) Date of Patent: Sep. 7, 2021

(54) METHOD AND DEVICE FOR PERFORMING DEVICE-TO-DEVICE COMMUNICATION BY SHARING UPLINK RESOURCE AND SIDELINK RESOURCE IN WIRELESS COMMUNICATION SYSTEM

(71) Applicant: LG ELECTRONICS INC., Seoul (KR)

(72) Inventors: Ilmu Byun, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 77 days.

(21) Appl. No.: 16/613,108

(22) PCT Filed: Jan. 31, 2018

(86) PCT No.: PCT/KR2018/001311
§ 371 (c)(1),
(2) Date: Nov. 12, 2019

(87) PCT Pub. No.: WO2018/221829
PCT Pub. Date: Dec. 6, 2018

(65) Prior Publication Data
US 2020/0100119 A1 Mar. 26, 2020

Related U.S. Application Data

(60) Provisional application No. 62/512,063, filed on May 28, 2017.

(51) Int. Cl.
*H04W 16/28* (2009.01)
*H04W 4/40* (2018.01)
(Continued)

(52) U.S. Cl.
CPC ............. *H04W 16/28* (2013.01); *H04W 4/40* (2018.02); *H04W 72/044* (2013.01);
(Continued)

(58) Field of Classification Search
CPC ....... H04W 16/28; H04W 4/20; H04W 76/27; H04W 72/044; H04W 72/085;
(Continued)

(56) References Cited

U.S. PATENT DOCUMENTS

2013/0215844 A1\* 8/2013 Seol ................ H04B 7/0695
370/329
2014/0073329 A1 3/2014 Kang et al.
(Continued)

FOREIGN PATENT DOCUMENTS

KR 1020140016854 2/2014
KR 1020160081746 7/2016
(Continued)

OTHER PUBLICATIONS

European Patent Office Application Serial No. 18810587.8, Search Report dated Mar. 13, 2020, 6 pages.
(Continued)

*Primary Examiner* — Mewale A Ambaye
(74) *Attorney, Agent, or Firm* — Lee, Hong, Degerman, Kang & Waimey

(57) ABSTRACT

Provided are a method and a device for performing device-to-device communication by sharing an uplink resource and a sidelink resource in a wireless communication system. Particularly, a first terminal receives, from a base station, beam scanning signals and a first threshold value. The first terminal generates first reception beam information including beam information of a signal received at a signal intensity greater than or equal to the first threshold value, among the beam scanning signals. The first terminal receives
(Continued)

second reception beam information from the base station. The second reception beam information includes beam information of a first uplink signal received by the base station from a second terminal. The first terminal transmits a sidelink signal through the sidelink resource by using a beam obtained by excluding a third reception beam from a first reception beam. The third reception beam is a beam of the first terminal for receiving a signal transmitted using a transmission beam of the base station in the same direction as a second reception beam. The sidelink resource is overlapped with the uplink resource in time and frequency domains.

14 Claims, 20 Drawing Sheets

(51) Int. Cl.
  *H04W 76/27* (2018.01)
  *H04W 72/04* (2009.01)
  *H04W 72/08* (2009.01)
  *H04L 5/14* (2006.01)
(52) U.S. Cl.
  CPC ......... *H04W 72/085* (2013.01); *H04W 76/27* (2018.02); *H04L 5/14* (2013.01)
(58) Field of Classification Search
  CPC ... H04W 72/04; H04W 72/046; H04W 72/14; H04W 92/18; H04W 36/00; H04W 36/08; H04W 36/32; H04W 4/40; H04W 4/42; H04W 4/46; H04L 5/14
  See application file for complete search history.

(56) References Cited

U.S. PATENT DOCUMENTS

| | | | |
|---|---|---|---|
| 2014/0274088 A1* | 9/2014 | Talwar | H04W 72/046 |
| | | | 455/452.1 |
| 2017/0331670 A1* | 11/2017 | Parkvall | H04W 52/0245 |
| 2017/0339574 A1* | 11/2017 | Zhang | H04B 7/088 |
| 2019/0260485 A1* | 8/2019 | Byun | H04B 17/24 |
| 2020/0274606 A1* | 8/2020 | Kang | H04B 7/0695 |
| 2021/0058914 A1* | 2/2021 | Chae | H04W 72/046 |

FOREIGN PATENT DOCUMENTS

| | | |
|---|---|---|
| KR | 1020160120250 | 10/2016 |
| WO | 2016108548 | 7/2016 |

OTHER PUBLICATIONS

PCT International Application No. PCT/KR2018/001311, International Search Report dated Apr. 25, 2018, 4 pages.

3rd Generation Partnership Project (3GPP), "Technical Specification Group Services and System Aspects; Study on enhancement of 3GPP Support for 5G V2X Services (Release 15)," 3GPP TR 22.886 V15.1.0, Mar. 2017, 58 pages.

Zulhasnine, M. et al., "Efficient Resource Allocation for Device-to-Device Communication Underlaying LTE Network", 2010 IEEE 6th International Conference on Wireless and Mobile Computing, Network and Communications, Nov. 2010, 10 pages.

* cited by examiner

FIG. 12
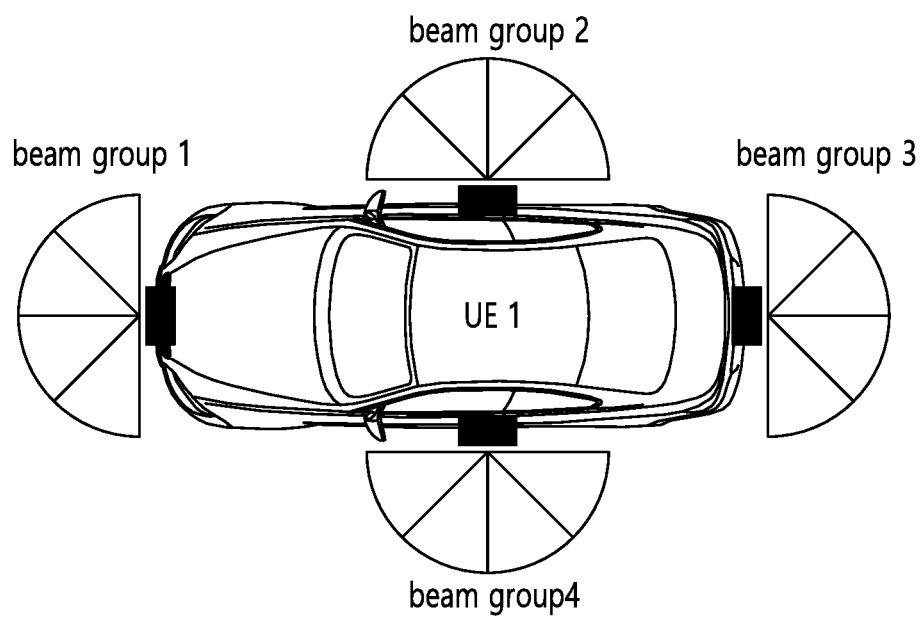
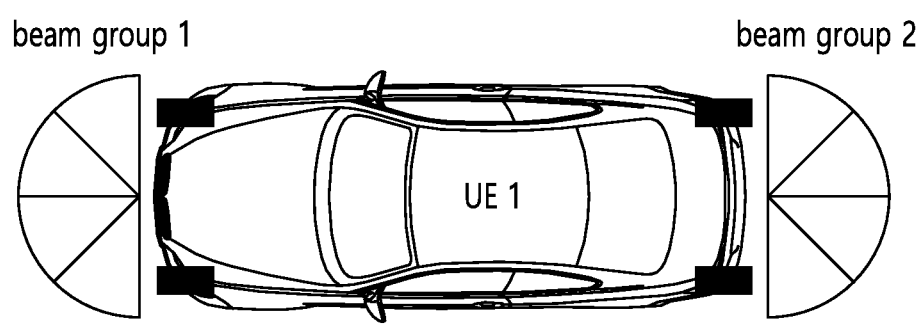
■ : RU

FIG. 13
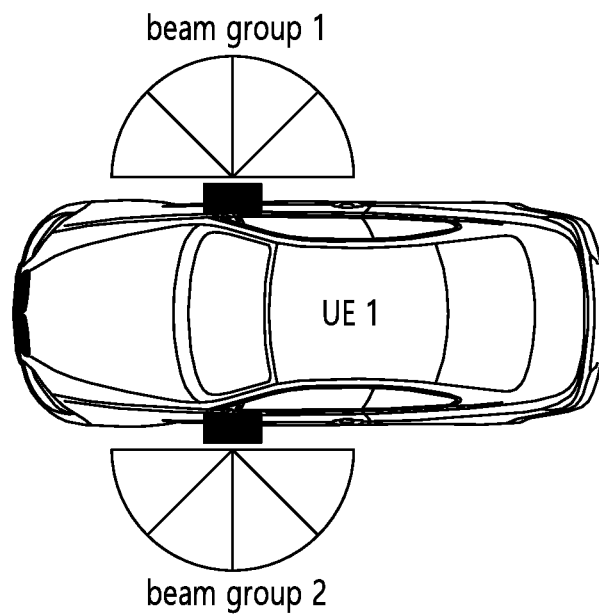
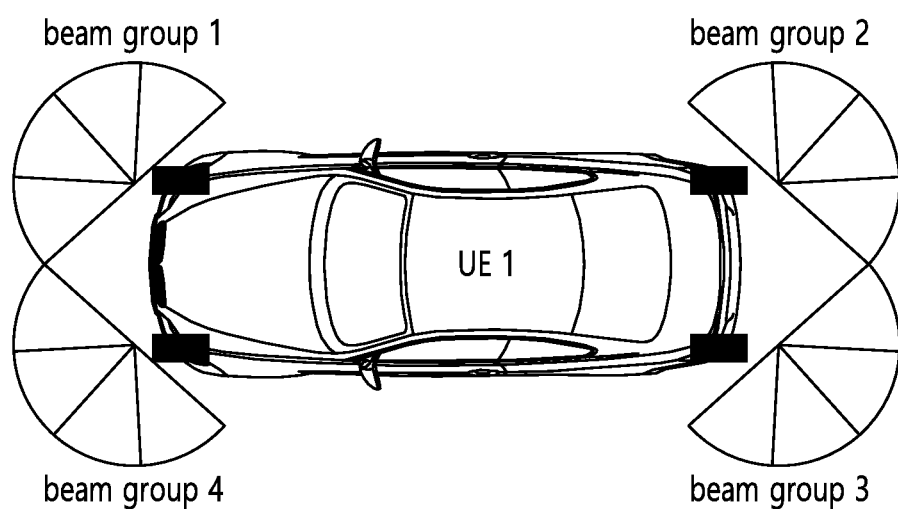
■ : RU

METHOD AND DEVICE FOR PERFORMING DEVICE-TO-DEVICE COMMUNICATION BY SHARING UPLINK RESOURCE AND SIDELINK RESOURCE IN WIRELESS COMMUNICATION SYSTEM

CROSS-REFERENCE TO RELATED APPLICATIONS

This application is the National Stage filing under 35 U.S.C. 371 of International Application No. PCT/KR2018/001311, filed on Jan. 31, 2018, which claims the benefit of U.S. Provisional Application No. 62/512,063, filed on May 28, 2017, the contents of which are all hereby incorporated by reference herein in their entirety.

BACKGROUND

Field

The present specification relates to wireless communication, and more particularly, to a method of performing communication between terminals by sharing an uplink resource and a sidelink resource in a wireless communication system, and a device using the method.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

Early completion of the corresponding radio access network (RAN) specification for PC5-based V2V and integration with Uu interface will enable fast preparation for device and network implementation, thereby allowing more chance for LTE-based V2V in the market. In addition, it can provide the basis for other V2X services, especially vehicle-to-infrastructure/network (V2I/N) and vehicle-to-pedestrian (V2P) services, so that RAN support for all the V2X services can be completed in time.

SUMMARY

The present specification provides a method and apparatus for performing communication between terminals by sharing an uplink resource and a sidelink resource in a wireless communication system.

The present specification proposes a method and apparatus for performing communication between terminals by sharing an uplink resource and a sidelink resource.

The apparatus includes a radio frequency (RF) for transmitting and receiving a radio signal and a processor operatively coupled to the RF unit.

In the present embodiment, since a characteristic of channel reciprocity in a time division duplex (TDD) system can be used, the terminal does not have to transmit a reference signal such as a sounding reference signal (SRS). If the terminal strongly receives a beam A transmitted by the base station in a beam direction n, the channel reciprocity may correspond to a characteristic in which, when the terminal transmits a signal by using/based on the beam direction n, the base station also strongly receive a signal in a reception (Rx) beam direction A.

In addition, in the present embodiment, a first terminal may correspond to a sidelink (SL) terminal capable of transmitting a sidelink signal, and a second terminal may correspond to an uplink (UL) terminal capable of transmitting an uplink signal. The first terminal may transmit/receive the sidelink signal with respect to the second terminal. Alternatively, the first terminal may transmit/receive the sidelink signal with respect to another SL terminal other than the second terminal. The uplink resource and the sidelink resource share a time/frequency resource, but may perform communication in a spatially divided manner by using/based on a beam to which a distributed antenna is applied. In this case, the terminal may have a plurality of radio units (RUs). The RU may correspond to an antenna port. A beam or a beam group may be configured with the antenna port.

The first terminal receives a beam scanning signal and a first threshold from a base station. The beam scanning signal may be included in a synchronization signal block within a synchronization signal burst transmitted periodically by the base station.

The first terminal generates information on a first Rx beam of a signal received with signal strength greater than or equal to the first threshold among the beam scanning signals. Since the beam scanning signal is a downlink signal, the information on the first Rx beam may include information on an Rx beam of the first terminal which receives the downlink signal. If the downlink signal has signal strength greater than or equal to the first threshold, since it may cause interference on a sidelink signal, the first terminal may select a beam which is not used in a sidelink resource through the first threshold.

The first terminal receives information on a second Rx beam from the base station. The second Rx beam is an Rx beam of a first uplink signal received by the base station from the second terminal.

The sidelink resource overlaps with the uplink resource in time and frequency domains. Accordingly, since the first uplink signal may directly interfere with the sidelink signal, the first terminal needs to know information on an Rx beam of the base station which receives the first uplink signal. That is, information on the second Rx beam may include information on the Rx beam of the base station which receives the first uplink signal.

The first terminal transmits a sidelink signal by using/based on a beam except for a third Rx beam from the first Rx beam. The third Rx beam is a beam of the first terminal which receives a signal transmitted by using/based on a transmission beam of the base station in the same direction as the second Rx beam. Herein, the transmission beam of the base station in the same direction as the second Rx beam may have a beam width different from that of the second Rx beam, and a directing point of the beam may have some errors. Since the first terminal may know a beam which may cause interference between an uplink and a sidelink through information on the first Rx beam and information on the second Rx beam, a sidelink signal may be transmitted by using/based on a beam except for a corresponding beam. Accordingly, the use of the beam which may cause interference between the uplink and the sidelink may be limited.

In addition, the first terminal may receive a second threshold from the base station. When the first terminal applies the second threshold, the number of beams used to transmit the sidelink may increase if an uplink channel state is good. For example, the first terminal may retain a beam having signal strength greater than or equal to the first threshold as a candidate beam, and may use the beam when transmitting the sidelink signal since it is considered that a beam having signal strength less than or equal to the second threshold does not have great effect on interference among the candidate beams. In other words, the sidelink signal may be transmitted by using/based on a beam of a signal received with signal strength greater than or equal to the first threshold and a beam of a signal received with signal strength less than or equal to the second threshold. In this case, the second threshold may be set to be greater than or equal to the first threshold.

In addition, when the base station receives a second uplink signal from a third terminal by using/based on a fourth Rx beam, the second threshold may be set according to each of a direction of the second Rx beam and a direction of the fourth Rx beam. Also in this case, a beam having signal strength less than or equal to a smaller threshold between the second threshold corresponding to an Rx beam direction of the first uplink signal and the second threshold corresponding to an Rx beam direction of the second uplink signal may be used when the first terminal transmits the side link signal. The first uplink signal and the second uplink signal may be transmitted through the uplink resource.

The first threshold may be received through radio resource control (RRC) signaling. The second threshold may be received through a common control signal. The common control signal may be a common physical control signal transmitted on a common PDCCH or PDSCH.

Information on the first Rx beam may include information on a time index of a time of receiving a signal received with signal strength greater than or equal to the first threshold, an antenna port of receiving the signal received with the signal strength greater than or equal to the first threshold, or a direction of the first Rx beam.

A direction of the first Rx beam may be indicated with the time index in a downlink resource. In new RAT (NR), a direction of a beam may be identified with the time index. In this case, the first uplink signal may be received by using/based on an Rx beam indicated (or mapped) with the time index in the uplink resource. In addition, the second uplink signal may also be received by using/based on an Rx beam indicated (or mapped) with the time index in the uplink resource.

The sidelink signal may be transmitted in a unicast or multicast manner. A broadcast or discovery signal between terminals requires a dedicated resource. However, since a unicast signal between terminals is transmitted aperiodically when traffic occurs in the terminal, a sidelink resource overlaps with an uplink resource, thereby reducing resource consumption.

According to the proposed method, an uplink (UL) resource and a sidelink (SL) resource are allocated to the same time/frequency resource by using the proposed method, thereby increasing efficiency of utilizing a network resource. This effect may be greater when a signal transmitted in the SL resource is aperiodic and/or sporadic traffic and a base station does not manage every signal transmission of the SL resource.

BRIEF DESCRIPTION OF THE DRAWINGS

FIG. 12 shows an example of constituting a beam group for V2X communication.

FIG. 13 shows another example of constituting a beam group for V2X communication.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the 3GPP LTE/LTE-A. However, technical features of the present specification are not limited thereto.

Figure 1:
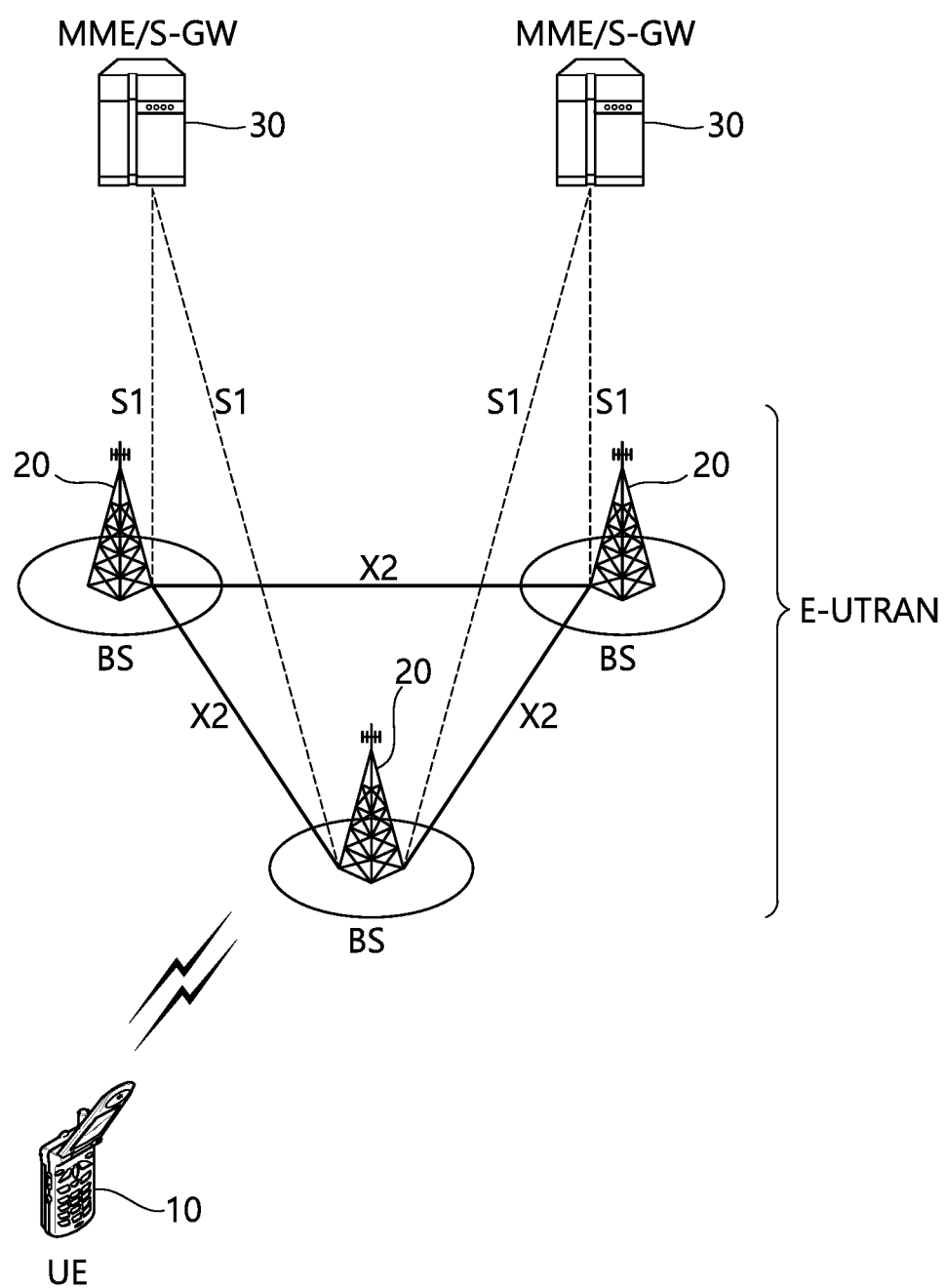
FIG. 1 illustrates a wireless communication system to which the present specification is applied.

FIG. 1 illustrates a wireless communication system to which the present specification is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
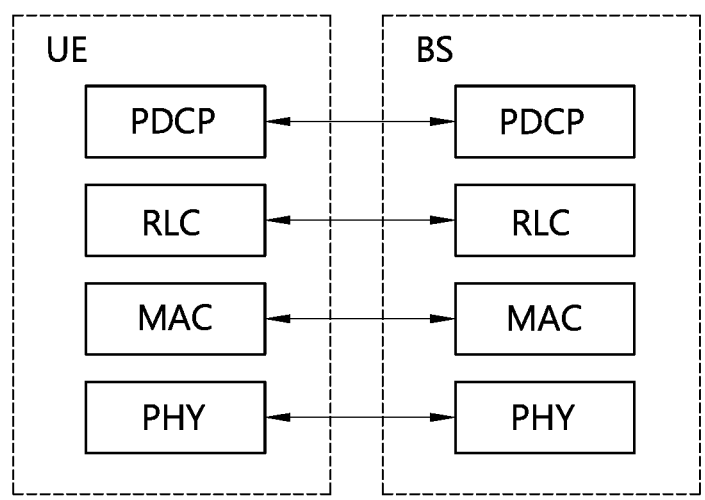
FIG. 2 is a block diagram illustrating a radio protocol architecture for a user plane.
Figure 3:
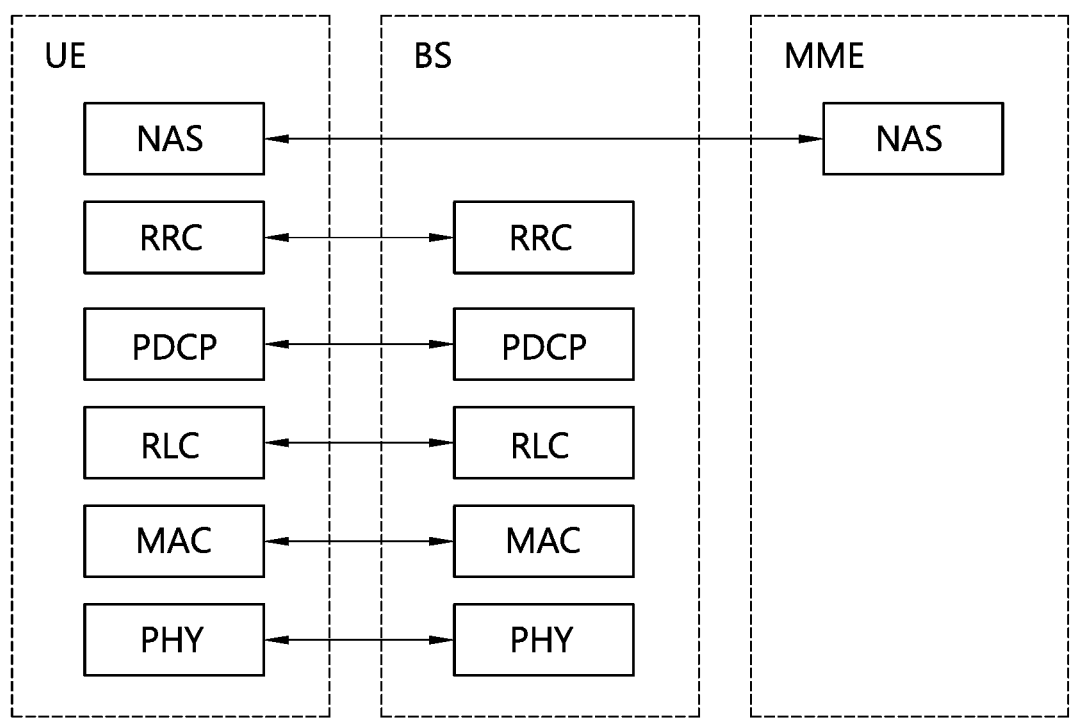
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, a sidelink is described. The sidelink is an interface between UEs for sidelink communication and sidelink direct discovery. The sidelink corresponds to a PC5 interface. The side link communication is AS functionality enabling proximity-based services (ProSe) direct communication between two or more nearby UEs by using an E-UTRAN technique but not traversing any network node. The sidelink discovery is AS functionality enabling ProSe direct discovery between two or more nearby UEs by using the E-UTRA technique but not traversing any network node. The sidelink uses a UL resource and physical channel structure similarly to UL transmission. Sidelink transmission uses the same basic transmission scheme as the UL transmission scheme. However, the sidelink is limited to single cluster transmission for all sidelink physical channels. In addition, the sidelink uses a gap of one symbol at an end of each sidelink subframe.

Figure 4:
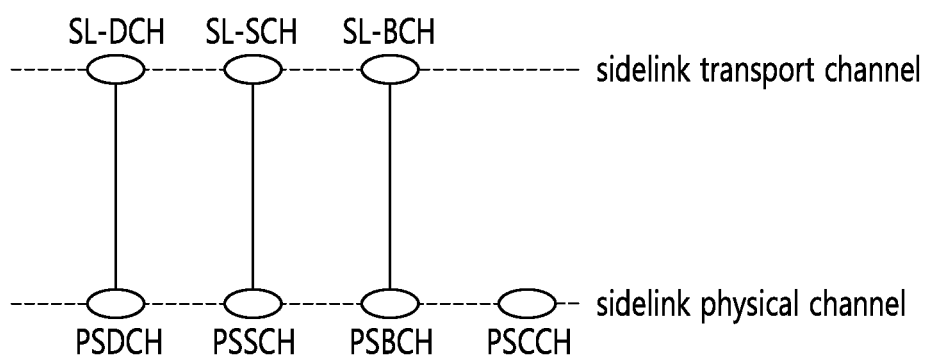
FIG. 4 shows mapping between sidelink transport channels and sidelink physical channels.

FIG. 4 shows mapping between sidelink transport channels and sidelink physical channels. Referring to FIG. 4, a physical sidelink discovery channel (PSDCH) carrying sidelink discovery message from the UE is mapped to a sidelink discovery channel (SL-DCH). A physical sidelink shared channel (PSSCH) carrying data from a UE for sidelink communication is mapped to a sidelink shared channel (SL-SCH). A physical sidelink broadcast channel (PSBCH) carrying system and synchronization related information, transmitted from the UE, is mapped to a sidelink broadcast channel (SL-BCH). A physical sidelink control channel (PSCCH) carries control from a UE for sidelink communication.

Figure 5:
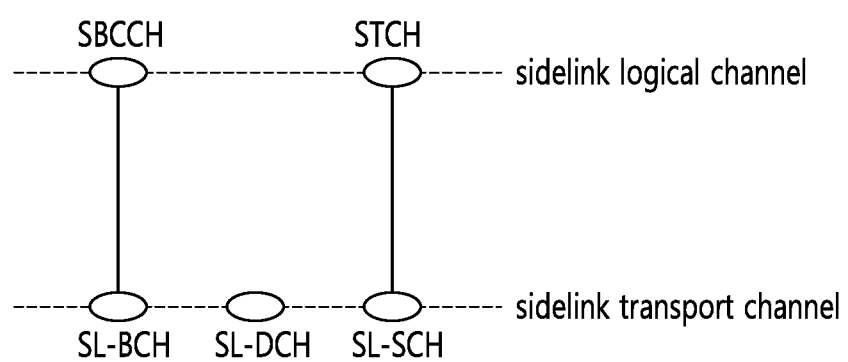
FIG. 5 shows mapping between sidelink logical channels and Sidelink transport channels.

FIG. 5 shows mapping between sidelink logical channels and Sidelink transport channels. Referring to FIG. 5, SL-BCH is mapped to a sidelink broadcast control channel (SBCCH). The SBCCH is a sidelink channel for broadcasting sidelink system information from one UE to other UE(s). This channel is used only by sidelink communication capable UEs. SL-SCH is mapped to a sidelink traffic channel (STCH). The STCH is a point-to-multipoint channel, for transfer of user information from one UE to other UEs. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
  Uu transmission/reception (highest priority);
  PC5 sidelink communication transmission/reception;
  PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Hereinafter, space division duplex (SDD) for V2X communication is described.

The SDD considered in the present specification is a technique in which each antenna of a UE is subjected to space division to independently operate a communication link of each antenna. In order to independently operate the communication link for each antenna, self-interference between antennas of the UE shall be cancelled, and inter-ference between UEs included in the communication link shall be reduced.

As a technique for cancelling the self-interference between the antennas of the UE, there is a technique of applying analog and digital self-interference cancellation techniques or a technique of reducing the self-interference by securing a distance between the antennas. The latter has a lower complexity than the former and thus is easier to apply to real systems. The latter technique can be applied to a vehicle UE having a larger size than an existing communication UE by securing the distance between the antennas. The inter-cell interference reducing technique of the existing cellular communication system can be applied as a technique for reducing interference between UEs. At present, in cellular communication with a high frequency of at least 6 GHz, since a beam width is small in order to secure a communication distance, it is considered that there is a low probability that beams of adjacent cells overlap to cause interference. In addition, there is a high probability that a signal will is blocked by an object due to linearity of the signal. Since a surface of a vehicle is made of iron and a size thereof is large, there is a high probability that a high-frequency signal of an adjacent UE will be blocked.

Figure 6:
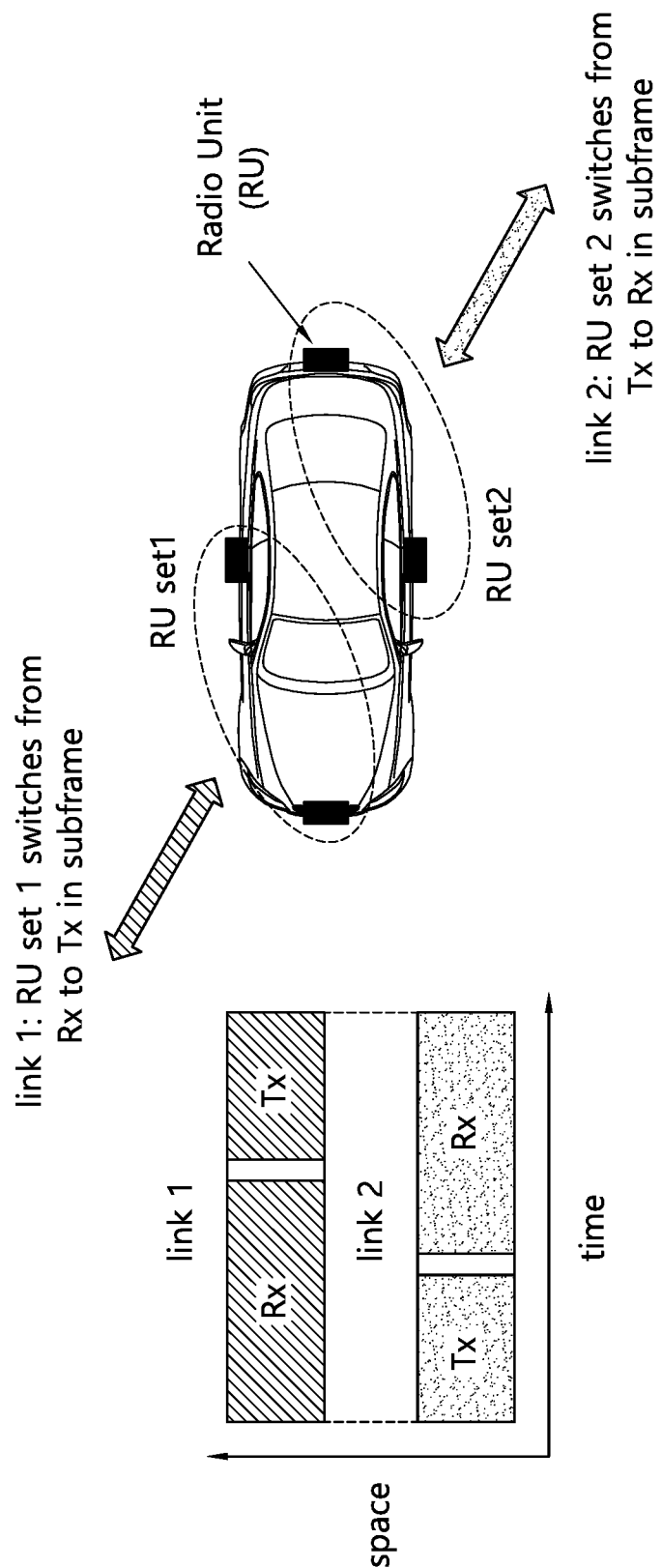
FIG. 6 shows an example of applying space division duplex (SDD) in a vehicle to which distributed antennas are applied.

Due to the above characteristics, space division communication is easy to apply in inter-vehicle high frequency communication with distributed antennas. When the space division communication is applied, since links of the antennas are isolated from each other, it is possible to allocate different transmission/reception points of the respective communication links and reuse frequency resources in each communication link. FIG. 6 is an example of applying space division communication.

FIG. 6 shows an example of applying SDD in a vehicle to which distributed antennas are applied.

In FIG. 6, a link 1 and a link 2 are communication links connected with different devices (UE or BS). According to a situation of each communication link, a transmission (Tx) resource and a reception (Rx) resource may change in amount, and a Tx time point and an Rx time point may change. In the figure above, a radio unit (RU) is an antenna module which aggregates a plurality of antennas. In this case, the UE has 4 RUs in a distributed manner 2 RUs out of the 4 RUs are used to construct the link 1, and the remaining 2 RUs are used to construct the link 2.

Figure 7:
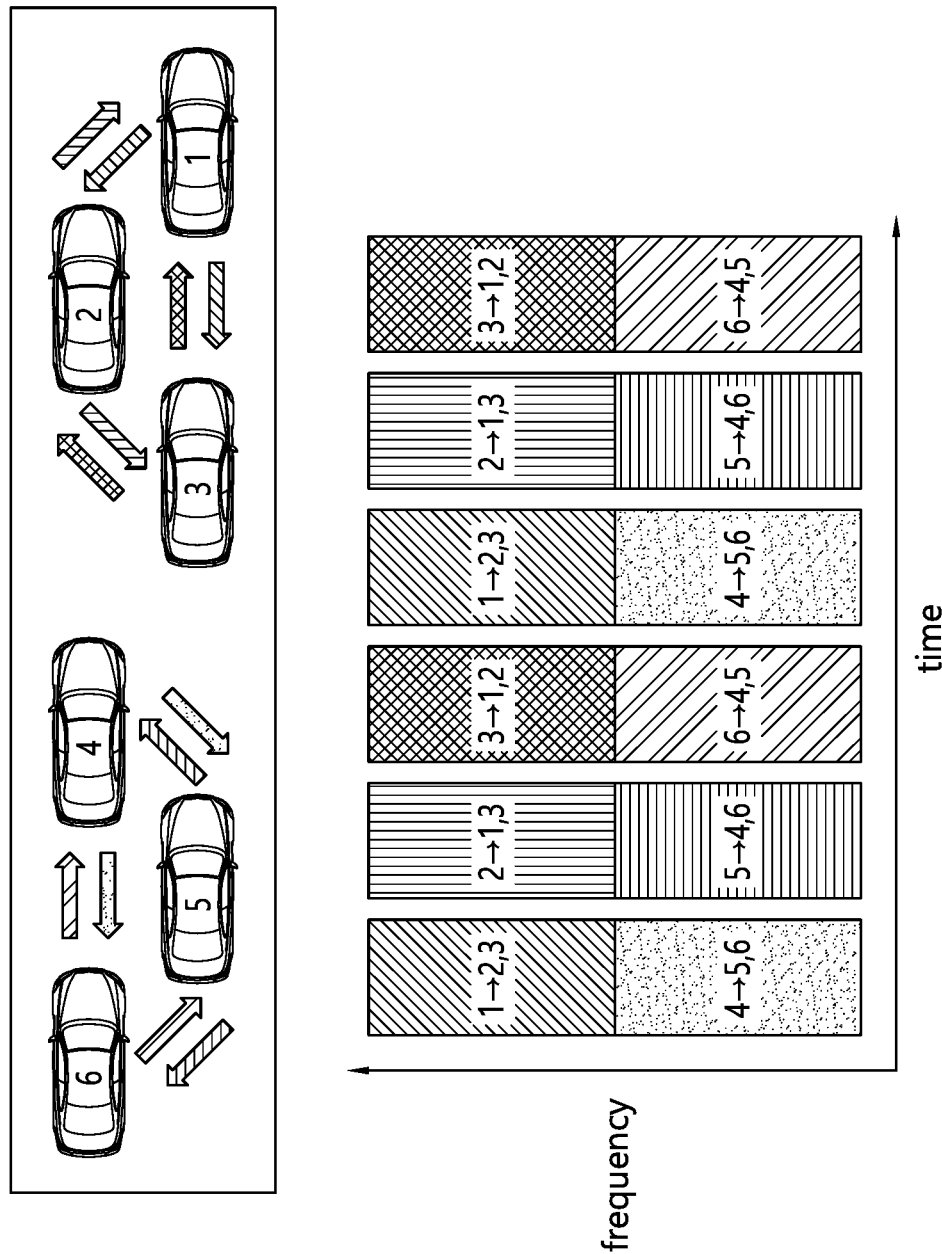
FIG. 7 shows an example of inter-vehicle communication to which SDD is not applied.
Figure 8:
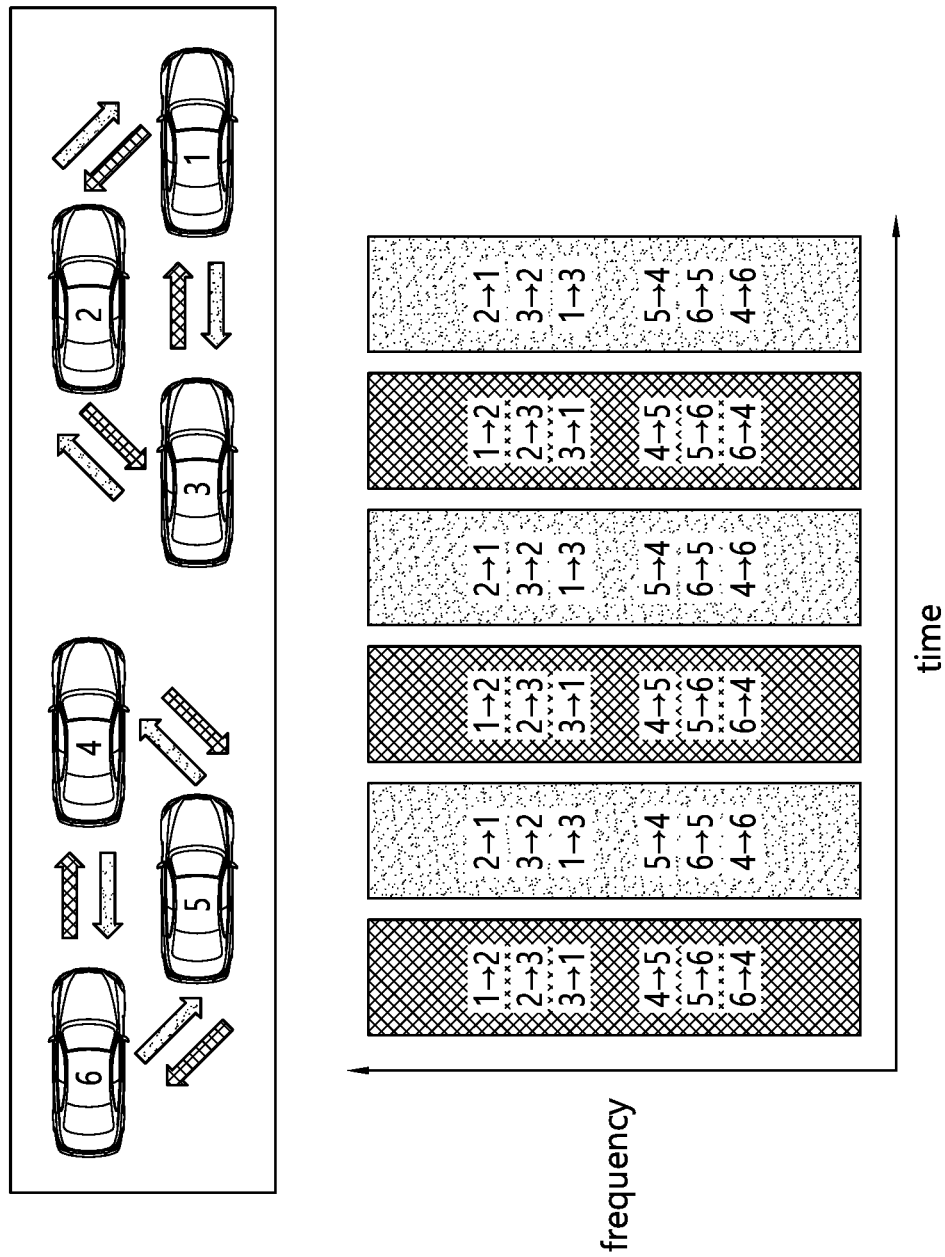
FIG. 8 shows an example of inter-vehicle communication to which SDD is applied.

When the SDD is applied to a plurality of UEs, there is an advantage in that transmission can be performed many times since more resources are used within a target time than the opposite case. FIG. 7 and FIG. 8 are examples of comparing a case of applying SDD and a case of not applying SDD.

FIG. 7 shows an example of inter-vehicle communication to which SDD is not applied. FIG. 8 shows an example of inter-vehicle communication to which SDD is applied.

When the SDD is not applied as shown in FIG. 7, a UE transmits signals simultaneously to different UEs in a multiplexed manner. If three UEs intend to establish a communication link with each adjacent UE as shown in FIG. 7, one transmission resource and two reception resources shall be allocated to each UE.

If the SDD is applied as shown in FIG. 8, since the UE needs to constitute one transmission resource and one reception resource for each communication link, the number of times of performing signal transmission may be greater in a unit time. In case of applying the SDD, a frequency resource allocated to the UE shall be shared with adjacent UEs which simultaneously transmit signals. If the SDD is applied, since a transmission signal of each UE is spatially divided, the same frequency resource can be used, thereby increasing the frequency resource used by each communication link.

In addition to the aforementioned advantage, since a receiving UE of each communication link receives a signal by using a narrow reception beam, a probability of being affected by jamming is decreased. In addition, since there is a high probability that an adjacent vehicle blocks a signal, jamming from a far distance is difficult. There is another advantage in that resource management complexity of a BS is decreased since the BS does not have to perform management so that inter-communication group resource and intra-communication group resource are resources orthogonal to each other. In TR 22.886, a scenario is included in which 15840 vehicles are present per one mile. In this case, complexity of the BS is too increased for the BS to manage each communication link between vehicles. When the SDD is applied, since only a transmission time point and a reception time point are to be determined between UEs included in the communication link, there is an advantage in that the complexity of the BS is decreased.

Hereinafter, a V2X use case for an automated vehicle is described.

<Scenario 1: Overtaking Maneuver Scenario>

Figure 9:
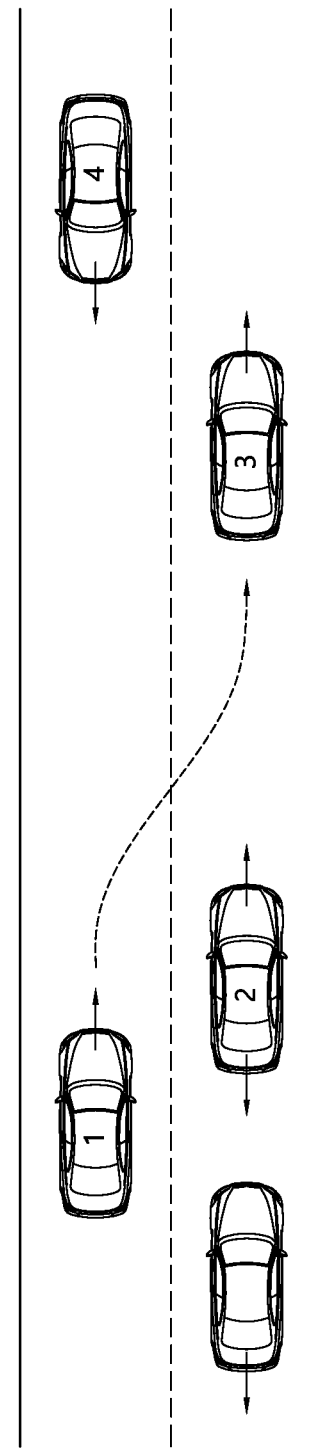
FIG. 9 shows an automated overtaking maneuver scenario in vehicle to everything (V2X) communication for an automated vehicle.

FIG. 9 shows an automated overtaking maneuver scenario in V2X communication for an automated vehicle.

Referring to FIG. 9, an automated vehicle 1 attempts to overtake another vehicle 2. During this attempt, an unpredictable change or deviation from the predicted trajectory may happen. It may come from the change of nearby vehicle's behavior or the appearance of animal and other objects on the road.

An overtaking maneuver has been planned with certain granularity and agreed upon by neighboring vehicles. The accuracy of the overtaking maneuver depends on the granularity (i.e. the size of discrete grid elements) of trajectories. If an unexpected road situation happens, a new joint solution needs to be negotiated quickly to avoid collisions. This needs to be completed before the vehicles enter the next grid element of the trajectory.

A road with a lane of width 3.5 m and a trajectory accuracy of 0.3 m is assumed in the present scenario. It is also assumed that vehicles on the road move with the speed of 30 m/s (108 km/h). In this case, each vehicle is passing a grid element every 10 ms.

If an unexpected road situation happens, a new plan has to be established in order to avoid an accident. A consolidated agreement on road trajectories requires at least three types of messages: a set of offered trajectories from each involved vehicle, an evaluation of all options, and an acknowledgment message. Each communication step needs to be completed within 3.3 ms, neglecting the computational requirements of each step.

<Scenario 2: Cooperative Perception Scenario>

Autonomous driving systems are based on the environmental information obtained via its own sensors. In reality, however, a vehicle cannot obtain the complete scene of the road and surrounding environment because of large trucks or busses blocking its view. Besides this, autonomous vehicles are expected not only to exchange the local awareness information between each other but also to be able to detect numerous features of surrounding environment by means of various sensors and cameras.

Cooperative active safety systems can warn drivers of dangerous situations and intervene through automatic braking or steering if the driver is unable to avoid an accident. Cooperative driving applications, such as platooning (road-trains) and highly automated driving can reduce travel time, fuel consumption, and CO2 emissions and also increase road safety and traffic efficiency. Moreover, not only cooperation between vehicles or between vehicles and infrastructure is required, but also the cooperation between vehicles and vulnerable road users, e.g. pedestrians and cyclists, through their mobile devices, such as smartphone and tablets, will be an important key element to improve traffic safety. C-ITS systems rely on timely and reliable exchange of information. Common to most applications are real-time requirements, and strict requirements on reliability and availability, especially when considering high mobility and large message sizes.

In addition, in the traffic scenario, the front vehicle could provide the real-time video data to the rear vehicle on as-needed basis in complex driving situation such as an automatic overtaking maneuver. Usual values for commercial video encoders are in the range of 100 ms. Thus, the video is assumed to be transmitted in raw format to avoid encoding and decoding delays and be used in real time for driving purpose. The camera capabilities shall be sufficient for feature extraction suitable for future autonomous driving task. Assuming gray-scale video with a resolution 1280×720 pixels and a refresh state of 30 fps, a data rate of 220 Mbps is required.

In addition, end-to-end latency requirements of less than 5 ms for message sizes of about 1600 bytes need to be guaranteed for all V2X transmissions. Data is sent either event-driven or periodically with a rate of about 10 Hz. Relative speeds of up to 500 km/h are possible on high-speed highways. Periodic broadcast traffic consist of at least 1600 bytes with repetition rate of 1-50 Hz for transmission of information related to objects resulting from local environmental perception and the information related to the actual vehicle.

<Scenario 3: Platooning Scenario with/without Leading Vehicle>

Use case 3-1 (platoon with leading vehicle): Vehicles properly arranged in platoons with enabled automated control of their speed and steering allow to reduce fuel consumption, increase safety, improve road congestion and increase driver convenience. For obtaining true benefit from platooning, each vehicle in platoon must be equipped with certain communication technology to exchange real-time information about a change of platoon's common parameters, such as acceleration, breaking, change of trajectory, etc. Also, the vehicles have to follow each other as near as possible for the improvement of road congestion and optimal fuel consumption, but on the other hand, close spacing leads to higher risk of collision and requires very strict latency and reliability constraints.

Use case 3-2 (platoon without leading vehicle): In a multi-lane convoy use case, a leading vehicle, centralized controller, or supervisor does not exist. Instead, the vehicle control, in both lateral and longitudinal directions, is distributed over all members of the convoy (see FIG. 9). The result of this approach is that vehicle disturbances, such as a braking vehicle, affect all members of the convoy to a greater or lesser extent, resulting in a stable formation.

Figure 10:
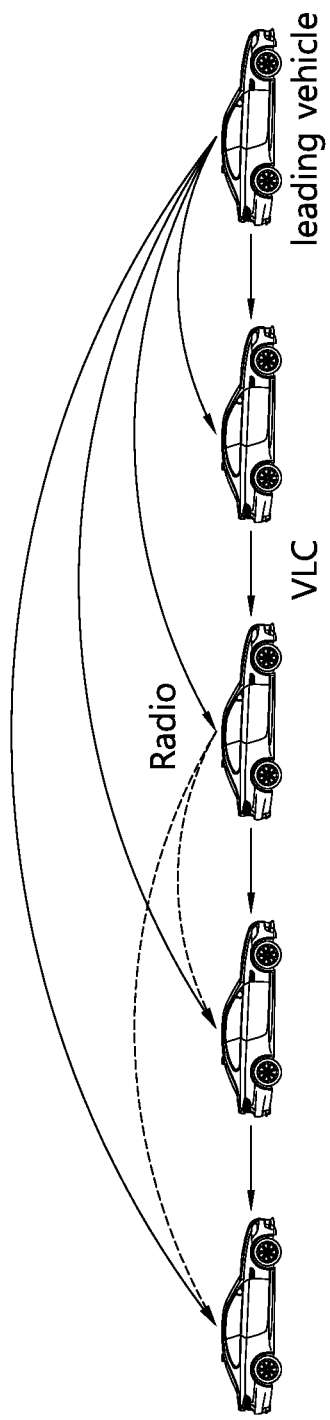
FIG. 10 shows a platoon scenario in V2X communication for an automated vehicle.

FIG. 10 shows a platoon scenario in V2X communication for an automated vehicle.

Scenario 3-1 (braking): It is assumed that each vehicle participated in a platoon has an advanced brake control to compensate for variances in vehicle load, road properties, and the brake system. The brake controller is imperfect so that the imperfection is modelled by additive Gaussian noise of a given variance. The probability of accident is approximately $10^{-6}$ when the variance of the brake controller is $10^{-4}$, vehicles in a platoon moves at speed of 23 m/s, the distance between vehicles is 4.5 m and the packet is successfully delivered at the first transmission. Thus, it can be seen that very low packet error rate (e.g. less than $10^{-6}$) is desirable.

Scenario 3-2 (platoon's common parameter+video data for cooperative perception): The leading vehicle in a platoon transmits platoon's common parameter to the following vehicles via a carrier 1. Also, its video data is delivered with/without platoon's common parameters to the rear vehicles in a multi hop fashion via a carrier 2. Usually, the carrier 2 has much higher frequency than the carrier 1. For example, DSRC and LTE V2V can be used as the carrier 1 and mmWave and visible light communication (VLC) can be used as the carrier 2. The carrier 1 has less propagation loss than the carrier 2 so that the carrier 1 can deliver platoon's common parameter to the last vehicle in the platoon within a short latency. However, the carrier 1 is vulnerable to radio jamming attacks and the areal spectral efficiency and data rate of the carrier 1 are lower than those of the carrier 2.

Scenario 3-3 (platoon without leading vehicle: convoy): In order to maintain small inter-vehicle distances, convoy members rely on the high-frequency exchange of up-to-date and high-quality vehicle dynamics data among vehicles in the convoy. The convoy control algorithm requires just the vehicle dynamics information of neighbor vehicles, instead of the information of all convoy members. As such, the algorithm scales well to large convoys and converges easily to a desired formation when vehicles join and leave the convoy.

Scenario 3-4: In addition to the scenario 2, I2V link or V2I2V link can be used to deliver verified information to vehicles in a platoon. Infrastructures collect information from its sensors and vehicles and forward it to a server. The server filters trumped-up and fabricated information. For example, the server could drop the information collected from vehicles in the black list. The server sends the filtered information to infrastructures and infrastructures forward the filtered information to vehicles in a platoon.

However, there is a possibility of signal blocking according to the aforementioned scenario. Reliability and low-latency of inter-vehicle communication are very important in a service such as a platoon or convoy described in the scenario 3. However, it is expected that a distance between vehicles is at least 4.5 m, and in general, a vehicle interval is set to about 6 to 8 m due to instability of a brake control device, a communication latency, or the like. When the vehicle interval is increased, any vehicle not belonging to the platoon may cut in between platoon groups to overtake. In this case, reliability of communication between platoon groups may deteriorate due to the cut-in vehicle. Summarizing terminologies, the platoon corresponds to a group of vehicles which are driven in a single lane, and autonomous driving is not necessary. The convoy corresponds to a group of vehicles which are driven in several lanes, and is used when the vehicle is automatically driven.

In addition, V2X communication is limited in an LTE system. Since a vehicle may cut in at any section of a platoon in the above scenario, a UE which blocks a signal may be any UE in a communication group. Therefore, in order to solve the aforementioned problem, any UE in a group shall be capable of relaying a signal transmitted by any UE. In the ongoing 3GPP V2X study item, studies are being conducted mainly on periodic signal broadcasting between vehicles, and a problem for the scenario cannot be solved by simply applying a corresponding result.

In addition, communication with low-latency and high-reliability is being proposed as a requirement for 5G V2X. For example, according to 3GPP TR22.886, in case of collective perception, it is necessary to transmit data to a vehicle in the range of 200 m with reliability of 99.999% within 3 ms, and in case of emergence trajectory, it is required to transmit data to a vehicle in the range of 500 m with reliability of 99.999% within 3 ms.

When the information is transmitted to the vehicle in the range of 500 m, there is a probability that the vehicle blocks a signal. Therefore, it is possible to consider a method of transferring a signal far away using multi-hop communication between vehicles. However, in multi-hop communication, a delay increases with the increase in the number of hops. This makes it difficult to transfer a signal within 3 ms. Therefore, a technique is needed to minimize the increase in the delay even if the number of hops increases.

Accordingly, a method of transmitting a relay signal for V2X communication capable of solving the above problem and necessity will be described hereinafter.

Figure 11:
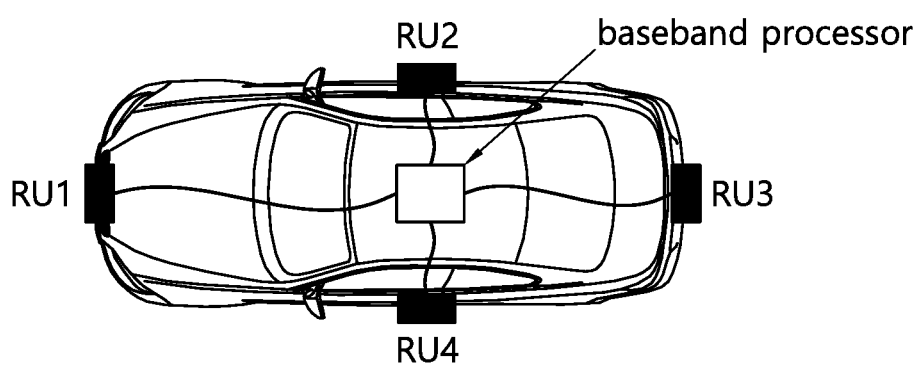
FIG. 11 shows an example of deploying a baseband processor and a radio unit (RU) in a vehicle which performs V2X communication.

FIG. 11 shows an example of deploying a baseband processor and an RU in a vehicle which performs V2X communication.

In the present specification, a radio unit (RU) may consist of one or multiple physical antennas, and one RU may have one or multiple antenna ports. The RU may simply have only a function of an RF module. When the RU simply has only the function of the RF module, the RU is the same as an antenna. In addition thereto, if the RU has only one antenna port, a single RU is the same as a single antenna port. The RU may include not only the function of the RF module but also the part or entirety of an L1 function or up to the part of an L2/L3 function.

In the present specification, the UE also includes a vehicle having a communication module installed therein, in addition to the existing mobile phone and smart phone. Referring to FIG. 11, the UE may have multiple RUs (RU 1, RU 2, RU 3, RU 4, . . . ). In addition, it can be seen that the multiple RUs are connected to a baseband processor.

In the present specification, a subframe is a time unit of a physical layer, and may be replaced with a time duration, a transmission time duration, a slot, a transmission unit (TU), or the like. In addition, a road side unit (RSU) described in the present specification may be a UE-type RSU or a BS-type RSU.

For example, when n vehicles constitute one platoon group, one communication group may be constituted by aggregating the n vehicles and an adjacent BS (herein, n is a natural number). For another example, all vehicles in a cell and a BS of the cell may constitute one communication group. In addition, one UE may belong to different communication groups at the same time.

Space division duplex communication described in the present specification implies not only communication in which an RU 1 and RU 2 of a UE 1 simultaneously transmit/receive signals but also communication in which the RU 2 can receive a signal while the RU 1 performs transmission or the RU 1 can receive a signal while the RU 2 transmits a signal. For this, the RU 1 and the RU 2 may be considered as a separate transmission and reception unit (TXRXU).

Although an entity for scheduling communication between UEs is described as a BS in the present specification, the BS may be replaced with an RSU or a UE-type RSU or a cluster head UE which is in charge of communication between the UEs.

A case where a UE is capable of configuring a beam group is assumed in the present specification. In the present specification, the beam group implies a unit by which the UE can independently perform transmission or reception. That is, a different beam group has a separate TXRXU. If self-interference between TXRXUs included in different beam groups is less than or equal to a specific value or can be decreased to be less than or equal to the specific value by using a self-interference canceller, the UE can transmit a signal in a beam group 2 while receiving a signal in a beam group 1. In addition, the beam group may be configured such that a Tx beam group and an Rx beam group are the same as or different from each other.

The beam group may correspond to the TXRXU in a one-to-one or one-to-many manner. That is, when the UE has N TXRXUs, the UE may construct N or less beam groups. In addition, the beam group may consist of one or more analog beams. For example, if the UE has N TXRXUs and analog beamforming is not applied to each TXRXU, the UE may have N beam groups and each beam group may consist of one beam. In this case, the beam group is the same as the TXRXU. For another example, if the UE has N TXRXUs and analog beamforming is applied to each TXRXU, the UE may have N beam groups and each beam group may consist of multiple beams.

FIG. 12 and FIG. 13 are examples of constructing a beam group when each RU has a separate TXRXU. In FIG. 12 and FIG. 13, a fan-shaped portion indicates a single beam, and implies a case where one beam group consists of four beams.

FIG. 12 shows an example of constituting a beam group for V2X communication.

In an upper end of FIG. 12, a UE 1 has four beam groups, and four TXRXUs are located in front, rear, and both sides of a vehicle. In a lower end, the UE 1 has two beam groups, and four TXRXUs are located only in front and rear of the vehicle.

FIG. 13 shows another example of constituting a beam group for V2X communication.

In an upper end of FIG. 13, a UE 1 has two beam groups, and two TXRXUs are located only in both sides of a vehicle. In a lower end of FIG. 13, the UE 1 has four beam groups, and four TXRXUs are located at corner portions in front and rear of the vehicle.

In what follows, the present specification aims to propose an interference measurement procedure by which a terminal having a plurality of radio units (RUs) receives a signal from a specific RU while transmitting a signal through other RU; and signaling related to the procedure. In particular, the present specification takes into account a case where interference exists between RUs, and an analog interference canceller capable of removing the interference is included in the RU.

Figure 14:
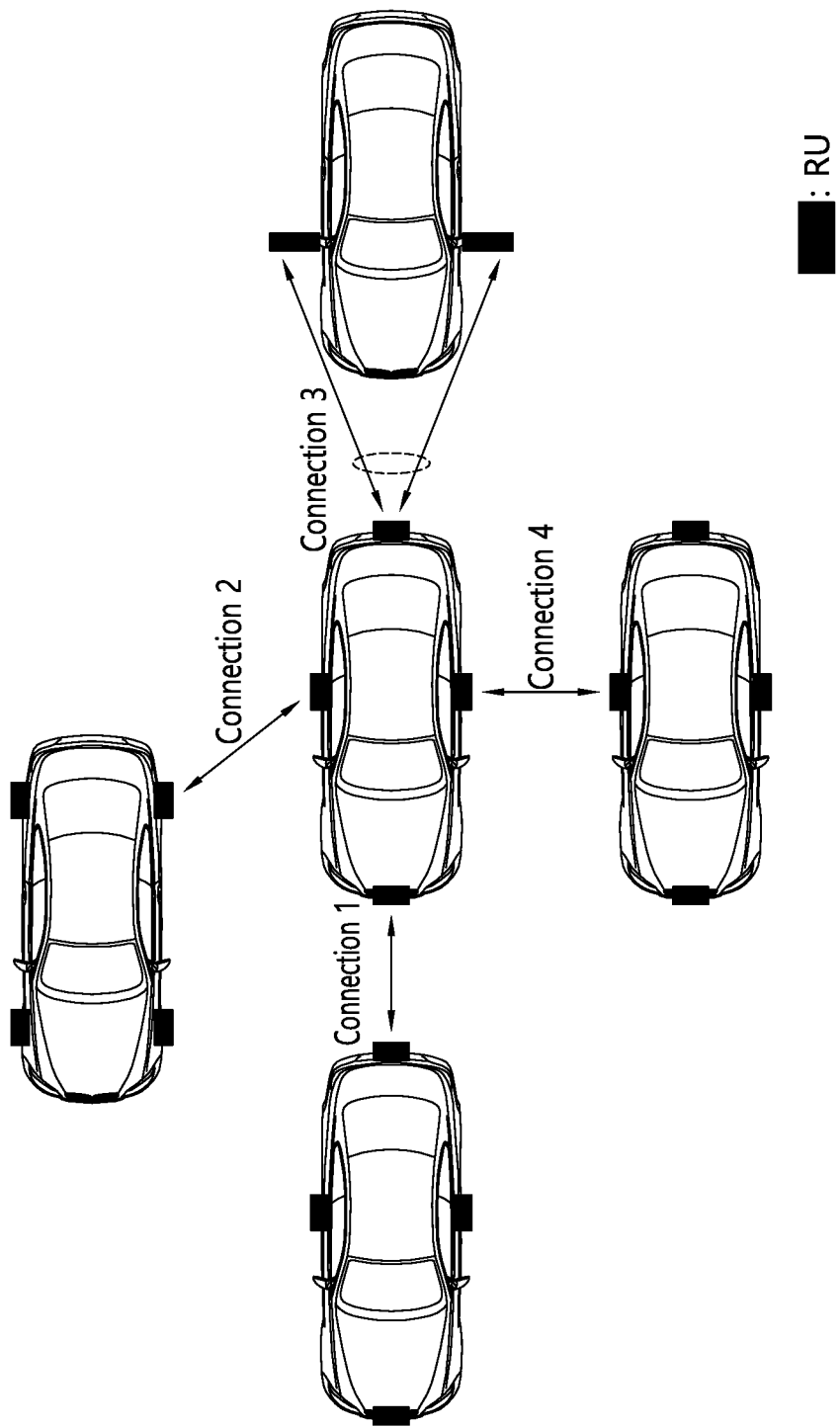
FIG. 14 illustrates one example where a plurality of communication connections are established among vehicles having a plurality of RUs.

FIG. 14 illustrates one example where a plurality of communication connections are established among vehicles having a plurality of RUs.

To provide services such as platooning, convoy, and cooperative maneuver assistance described above, a vehicle needs to establish a communication connection to other vehicles in its front, back, left and right sides as shown in FIG. 14. Therefore, a vehicle which has received the corresponding service forms a plurality of V2V links. Also, for a service such as platooning or convoy described in the scenario 3, it is important to achieve high reliability while satisfying a delay of about 3 ms.

The current LTE V2V communication has been developed to broadcast information of a vehicle in the surroundings thereof, and standardization of V2V connection establishment for unicast has not been carried out. Moreover, since it is important to transmit a signal in all directions for broadcasting, V2V communication technology has been developed under an assumption that a vehicle is equipped with a single RU having omni-antenna characteristics; however, it is expected that vehicles equipped with a plurality of RUs with directivity will be introduced in a near future. As shown in FIG. 14, if vehicle establishes a plurality of V2V communication connections, it is expected that a vehicle equipped with a plurality of RUs will have an advantage in terms of communication delay and capacity, technology development is needed, which enables a vehicle with a plurality of RUs to establish a plurality of communication connections. Besides, as shown in FIG. 14, if a vehicle equipped with a plurality of RUs performs an operation of transmitting a signal through a specific RU while receiving a signal from other specific RU, an advantage is obtained that signals may be transmitted within a shorter time period.

According to the present specification, an RU may be composed of one or more physical antennas, and one RU may have one or more antenna ports. An RU may provide only the function of a simple RF module or provide the whole or part of L1 function. Also, an RU may include part of L2/L3 function. If an RU has one antenna port and provides only the function of an RF module, a single RU is the same as a single antenna port. Therefore, an RU according to the present specification may be substituted by an antenna port group, antenna port, or antenna module.

In the present specification, a terminal includes a vehicle equipped with a communication model in addition to an existing mobile phone and smartphone, and the terminal may have a plurality of RUs. In the present specification, a subframe is a time unit of the physical layer and may also be called a time interval, transmission time interval, slot, or transmission unit (TU).

Space division duplex communication according to the present specification refers to such kind of communication by which not only RU1 and RU2 of a terminal may transmit and receive a signal simultaneously but also RU2 may receive a signal while RU1 transmits a signal or RU1 may receive a signal while RU2 transmit a signal. Also, a road side unit (RSU) in the present specification may be an RSU in the form of a terminal or an RSU in the form of a base station.

Space division duplex communication according to the present specification refers to such kind of communication by which not only RU1 and RU2 of a terminal may transmit and receive a signal simultaneously but also RU2 may receive a signal while RU1 transmits a signal or RU1 may receive a signal while RU2 transmit a signal. To this purpose, RU1 and RU2 may be regarded as a separate transmission and reception unit (TXRXU).

The present specification described below aims to propose a method of more effectively using a radio resource in a configuration in which an uplink resource and a resource for communication between UEs are shared.

When a BS allocates a resource for unicast signal transmission every time in a sidelink (SL), many signaling attempts are required for scheduling. In a representative case, a UE 1 requests the BS to allocate a resource to transmit a signal to a UE 2. In this case, at least the following signaling is required. The UE 1 transmits a scheduling request to the BS (signaling 1), and the BS instructs the UE 2 to receive a signal of the UE 1 (signaling 2) and then allocates a resource for signal transmission to the UE 1 (signaling 3). On the contrary, if the UE 1 can directly transmit a signal to the UE 2, the signaling may be unnecessary, or a signal indicating signal transmission of the UE 1 may be transmitted together with data.

The increase in the number of signaling attempts results in the increase in a pre-processing time for signal transmission between the UE 1 and the UE 2. If the UE fails to receive a signal in even any one of signaling attempts of a pre-processing procedure, reliability decreases due to a failure in signal reception. When communication is performed between neighboring vehicles, the decrease in the reliability more increases due to a coordination of the BS since a channel between the UE 1 and the UE 2 has better quality than a channel between the UE and the BS. In addition thereto, in a frequency band above 6 GHz, the channel between the BS and the UE has a greater signal blocking probability than a communication channel between the UEs. Therefore, a signal can be transmitted with shorter time and high reliability when using a scheme of performing communication between UEs without the coordination of the BS. Accordingly, it is necessary to transmit a unicast signal without the coordination of the BS.

A scheme of allocating a resource pool for unicast communication between UEs may be applied when the BS does not manage a resource of unicast communication between UEs in every signal transmission. If traffic of unicast communication between UEs is event-triggered traffic, the resource pool for unicast communication is ineffective when a time/frequency resource is allocated with a short period. The less the number of UEs requesting for unicast communication between UEs, the more severe the ineffectiveness. Therefore, a method of sharing the resource pool for unicast communication between UEs with another resource (e.g., a UL resource, a DL resource, an SL resource for broadcasting) may be applied.

That is, a broadcast signal of a sidelink or a discovery signal of the sidelink requires a dedicated resource, but a unicast signal between UEs is transmitted aperiodically only when traffic occurs. Therefore, a sidelink resource can be used by overlapping with another resource.

Interference may occur between signals when a resource pool for unicast communication between UEs is shared with another resource. For example, when an uplink resource and a corresponding resource pool share a time/frequency resource, unintended interference may occur in an uplink signal. In order to reduce the interference, a time/frequency resource shared between the uplink resource and the resource pool may be spatially divided.

Accordingly, the present specification proposes a scheme for applying spatial division when an uplink and a resource pool for unicast communication between UEs share a time/frequency resource.

Figure 15:
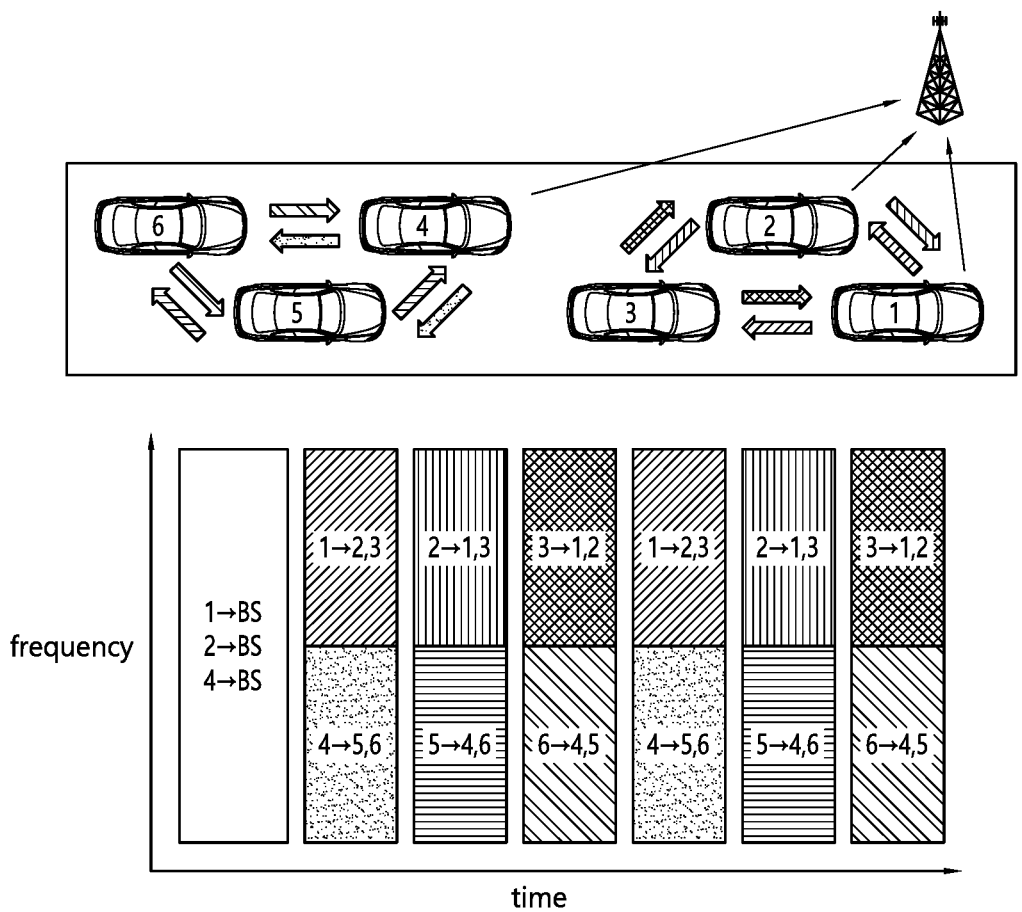
FIG. 15 shows an example of communication between vehicles to which SDD is not applied when an SL and a UL shares a time/frequency resource.
Figure 16:
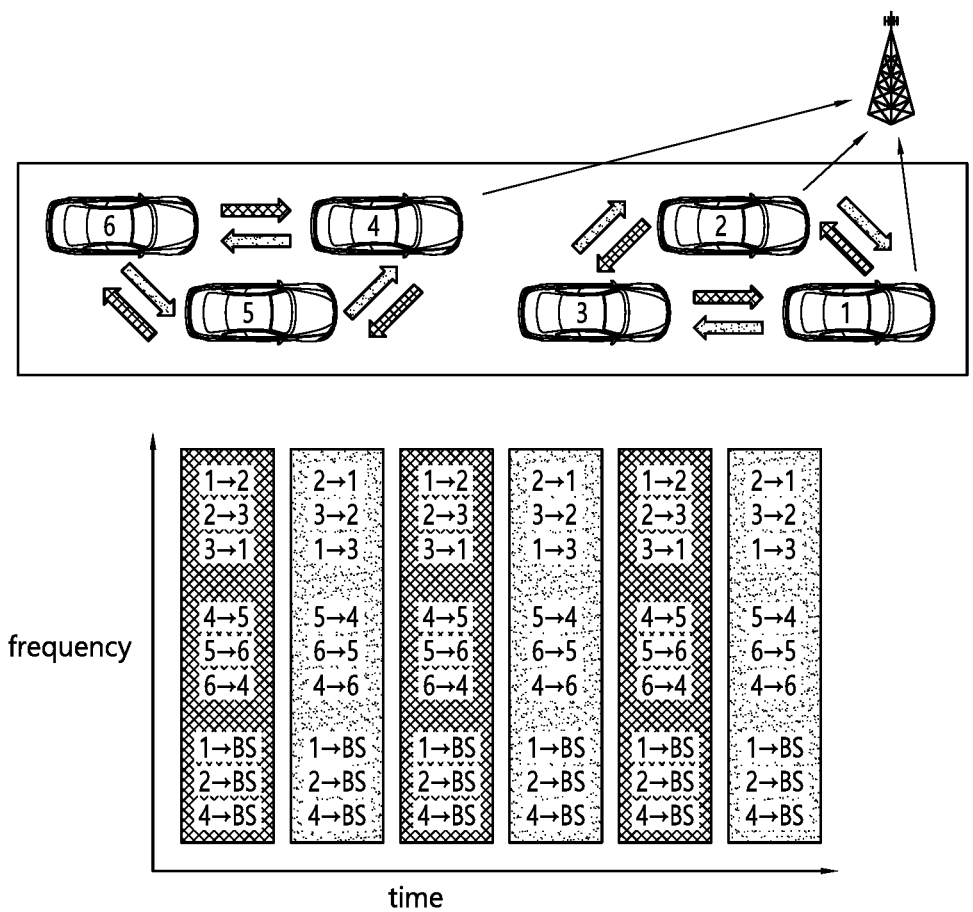
FIG. 16 shows an example of communication between vehicles to which SDD is applied when an SL and a UL share a time/frequency resource.

FIG. 15 shows an example of communication between vehicles to which SDD is not applied when an SL and a UL shares a time/frequency resource. FIG. 16 shows an example of communication between vehicles to which SDD is applied when an SL and a UL share a time/frequency resource.

FIG. 15 and FIG. 16 show an example of a case where a sidelink and an uplink share a time/frequency resource. In FIG. 15 and FIG. 16, vehicles 1, 2, and 3 and vehicles 4, 5, and 6 constitute one communication group, and exchange signals in this situation. In addition, a resource for signal transmission in the uplink is allocated to the vehicles 1, 2, and 4. In FIG. 15 and FIG. 16, '1→2,3' implies that the vehicle 1 transmits a signal to the vehicles 2 and 3 through multiplexing, and '1→BS' implies that the vehicle 1 transmits an uplink signal to the BS. In a case where SDD is not applied (FIG. 15), time/frequency resources orthogonal to each other are allocated to respective communication links. In a case where SDD is applied (FIG. 16), communication links share the time/frequency resource and also share a resource with an uplink resource.

The present specification proposes a scheme of more effectively using a radio resource through beam coordination in a situation where a sidelink (SL) resource and an uplink (UL) resource are shared for communication between UEs.

That is, the present specification is characterized in that a beam used in SL or UL transmission is limited by utilizing channel reciprocity of time division duplex (TDD) to reduce interference between the UL and the SL in a situation where a UL resource and an SL resource are shared. The SL resource or SL resource pool described in the present specification share the UL resource and a time/frequency resource.

Figure 17:
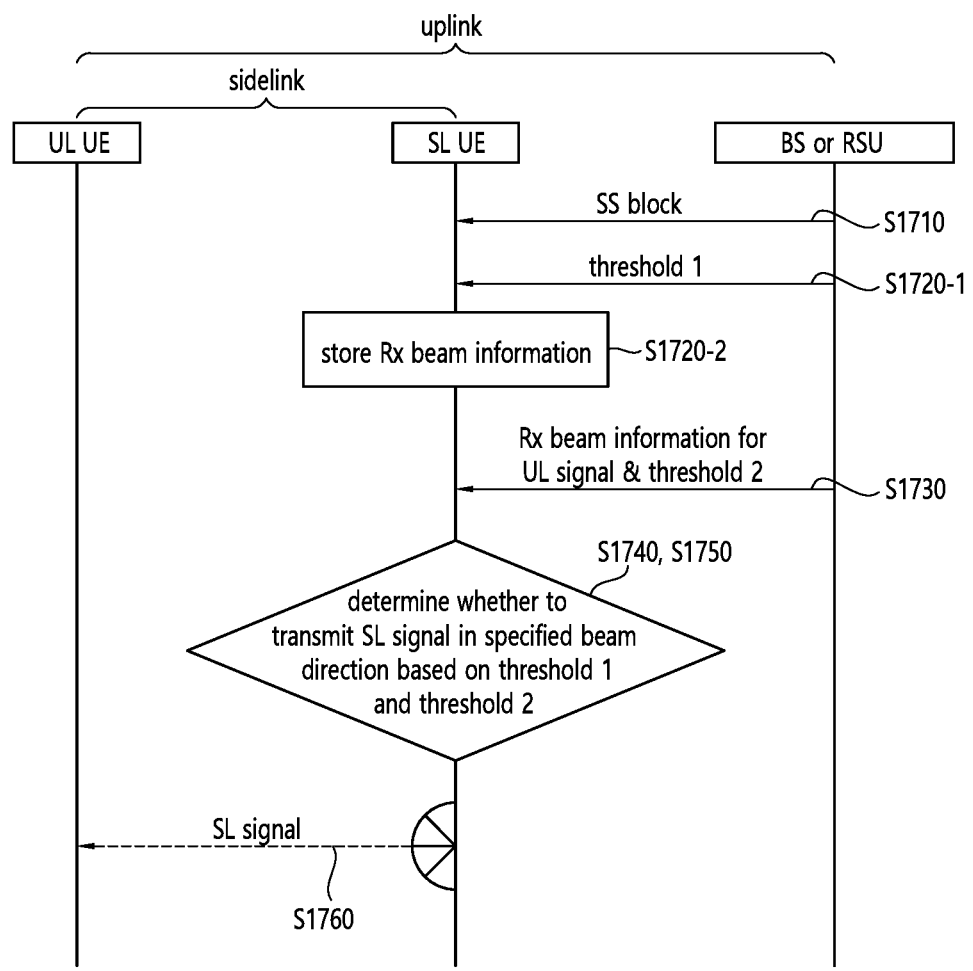
FIG. 17 shows an example for reducing interference between an uplink resource and a sidelink resource by using channel reciprocity.
Figure 18:
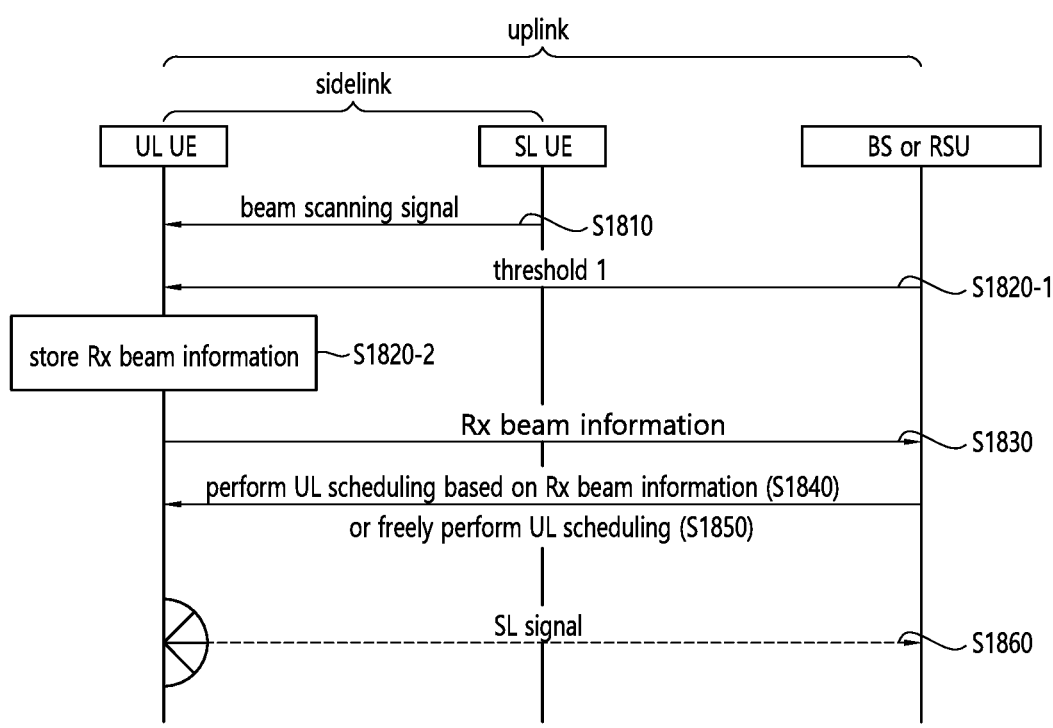
FIG. 18 shows another example for reducing interference between an uplink resource and a sidelink resource by using channel reciprocity.

In order to reduce interference between the UL and the SL in the aforementioned situation, an embodiment described in the present specification is shown in FIG. 17 and FIG. 18.

FIG. 17 shows an example for reducing interference between an uplink resource and a sidelink resource by using channel reciprocity. The example of FIG. 17 is an example for reducing interference on a UL UE, caused by an SL UE which determines that a UL signal has a higher priority than an SL signal and thus transmits the SL signal.

Referring to FIG. 17, in step S1710, the SL UE which intends to transmit a signal on an SL resource receives a synchronization signal (SS) block within a synchronization signal burst transmitted periodically by a BS. Even if the UL UE does not transmit or receive a UL/DL signal, an operation in which the SL UE receives the SS block may be performed periodically when it is intended to transmit the signal in the SL resource.

In step S1720, the BS transmits a threshold 1 to a UE allocated to the SL resource by using RRC signaling (or a common control signal of the UE allocated to the SL resource or a broadcasting signal in a cell) (S1720-1). The SL UE stores Rx beam information received with signal strength greater than or equal to the threshold 1 among SS block signals (S1720-2). For example, if an SS block having a time index t is received with signal strength greater than or equal to the threshold 1 in an Rx beam direction n of an antenna port (or RU) m of the SL UE, the SL UE stores information (t,m,n).

In step S1730, if the BS intends to receive a signal by using a beam mapped with the time index t in the UL resource (or by using a beam direction t), corresponding information is transmitted to the UE allocated to the SL resource. That is, Rx beam information of the BS for the UL signal may be transferred to the UE allocated to the SL resource by using a physical layer common control signal (e.g., a common physical control signal transmitted on a common PDCCH or PDSCH). The BS may transmit a threshold 2 from the physical layer common control signal. Herein, the threshold 2 may be set to a value greater than the threshold 1.

In step S1740, the SL UE does not transmit the SL signal for a beam direction t by using a beam direction n of an antenna port m, in which reception signal strength is greater than the threshold 1. If the SL UE receives the threshold 2 from the physical layer common control signal, the SL UE determines whether to transmit the signal by using the beam direction n of the antenna port m on the basis of the threshold 2 (i.e., for the beam direction t, the SL signal is not transmitted by using the beam direction n of the antenna port m, in which reception signal strength is greater than the threshold 2).

In step S1750, if the SL UE does not receive Rx beam information of the BS for the UL signal from the BS, the SL UE does not perform SL signal transmission for all beam directions in which signal strength is greater than or equal to the threshold 1.

In step S1760, the SL UE may transmit the SL signal through a beam having a limited beam direction on the basis of the threshold 1 or the threshold 2. For example, the SL UE may transmit the SL signal through a beam except for a specific beam having signal strength greater than the threshold 1. However, the SL UE may transmit the SL signal through a beam having signal strength less than the threshold 2 among the specific beams.

When the UE strongly receives a beam A transmitted by the BS in the beam direction n, the aforementioned scheme uses a characteristic of channel reciprocity which means that, when the UE transmits a signal by using the beam direction n, the BS also strongly receives the signal in an Rx beam direction A. To this end, the BS needs to inform the SL UE of beam direction information used by the BS to receive the UL signal similarly to step S1730. Herein, since the BS may dynamically perform UL signal scheduling, a method may be required in which a physical layer signal is used to report to a UE allocated to the SL resource. The BS may receive a UL signal by using semi-persistent scheduling (SPS). In this case, Rx beam information used by the BS may be transmitted through RRC signaling or may be transmitted by using a physical control signal when an SPS resource is activated. In addition, since Rx beam information of the BS is information commonly necessary to a UE which uses the SL resource, it is necessary to report this as UE common information.

In the aforementioned step S1720, the SL UE generates beam information, in which a reception signal level is greater than the threshold 1, in advance for each beam direction by using an SS block. When the SL UE generates this in advance, if the SL UE receives UL Rx beam direction information from the BS at a later time, there is an advantage in that a beam which is not to be used in an SL resource can be selected directly without a process of measuring Rx strength for each beam direction. To this end, the BS needs to transfer the threshold 1 in advance to the SL UE which intends to transmit a signal in the SL resource. Herein, the threshold 1 may be selected to the same value for all beam directions (a time index of all SS blocks), and may be reported by the BS to the UE.

In the aforementioned step S1740, the BS may additionally transmit a threshold 2. When the threshold 2 is applied, advantageously, there is an increase in the number of beams that can be used for signal transmission in the SL resource if a UL channel state is good. For example, when the threshold 1 is set to be smaller than the threshold 2, the SL UE may retain a beam candidate which will not use beams greater than the threshold 1 when the SL signal is transmitted. In addition, a beam in which Rx signal strength is less than the threshold 2 among the beam candidates may be used when the SL signal is transmitted. Therefore, the threshold 2 needs to be set to be greater than or equal to the threshold 1. Herein, since the UL channel state between the BS and the UE varies depending on the UE, the threshold 2 needs to be transmitted to the UE for each beam index used by the BS in signal reception. For example, when the BS intends to receive a signal of a UL UE 1 by using a beam direction A and receive a signal of a UL UE 2 by using a beam direction B, the BS may separately transmit the beam direction A and a threshold 2-A corresponding thereto and the beam direction B and a threshold 2-B corresponding thereto.

Since the SL UE may fail in decoding of beam information used when the BS receives a UL signal, step S1750 is required. When the SL UE fails to receive Rx beam information transmitted by the BS, if the SL UE freely selects a beam or antenna to be used in the SL resource, a great amount of interference may occur in the UL signal. Therefore, if the SL UE fails to receive UL Rx beam information, it is necessary that all beams exceeding the threshold 1 are not used in transmission within the SL resource. In addition, since the BS may not transmit UL Rx beam direction information, step S1750 is required for this.

In the aforementioned steps S1720 and S1740, only one beam direction may be used without distinction of an antenna port. Alternatively, only one the antenna port may be used without using the beam direction.

Some steps of the aforementioned procedure may be omitted. For example, steps S1730 and S1740 may be omitted. Alternatively, steps S1720 and S1750 may be omitted. Alternatively, step S1710 may be omitted. When step S1710 is omitted, there is a need for a process of measuring strength of a downlink beam of a beam direction A for a signal transmitted by the BS after the UE receives a signal transmitted by the BS in step S1730.

The aforementioned technical feature may be extended for the purpose of reducing interference on an SL UE, caused by a UL UE which transmits a UL signal. In this case, the proposed scheme mainly operates as shown in FIG. 18.

FIG. 18 shows another example for reducing interference between an uplink resource and a sidelink resource by using channel reciprocity.

Referring to FIG. 18, in step S1810, UL UEs receive a beam scanning signal transmitted periodically by an SL UE. The beam scanning signal may be transmitted as a sidelink discovery signal, or may be transmitted by constituting a block with a sidelink synchronization signal.

In step S1820, the BS transmits a threshold 1 to the UL UE by using RRC signaling (a common control signal of the UL UE or a broadcasting signal in a cell) (S1820-1). The UL UE stores Rx beam information for a signal received with signal strength greater than or equal to the threshold 1 among the beam scanning signals of the SL UE (S1820-2). For example, if a beam scanning signal transmitted at a time/frequency resource t is received with signal strength greater than or equal to the threshold 1 in an Rx beam direction n of an antenna port (or RU) m of the UL UE, the UE stores information (t,m,n).

In step S1830, the UL UE transmits Rx beam information obtained in step S1820 to the BS. A corresponding signal may be transmitted through L1 or L2/L3 signaling. For example, if it is transmitted through L2/L3 signaling, beam information may be transmitted together when the UL UE transmits a buffer status report (BSR) to the BS.

In step S1840, the BS performs UL scheduling by using the received beam information. If the UL UE reports that a signal of the SL UE is received strongly in a beam direction A, the BS may perform scheduling not to use the beam direction A when the UL UE transmits a UL signal.

In step S1850, if the BS does not receive Rx beam information from the UL UE, the BS freely performs UL scheduling.

In step S1860, the UL UE may transmit the UL signal through a beam having a limited beam direction according to the UL scheduling.

The aforementioned technique uses a channel reciprocity characteristic to restrict a beam used when a UL signal is transmitted. To this end, the UL UE needs to inform the BS of strongly received beam direction information similarly to the step S1830. Herein, if the beam direction information is reported through L1 signaling, an uplink control information (UCI) design may be necessary to report the beam direction information. Alternatively, the UL UE may transmit a scheduling request (SR) for UL signal transmission, and may transmit the beam direction information through L2/L3 signaling while transmitting a BSR by receiving a response from the BS. In this case, there is an advantage in that an additional UCI design of a physical layer is not necessary. However, if the beam direction information changes dynamically, performance deterioration may exist when the aforementioned method is applied.

In the aforementioned step S1820, the UL UE generates beam information, in which reception signal level is greater than the threshold 1, in advance for each beam direction by using a beam scanning signal of the SL UE. When the UL UE generates this in advance, there is an advantage in that beam scanning is not performed in a process in which the UL UE requests the BS to provide a UL resource at a later time. To this end, the BS needs to transfer the threshold 1 in advance to a UE which intends to transmit a signal in the UL resource. Herein, the threshold 1 may be set as a separate value to each UE. This is because a UL channel characteristic is difference between each UE and the BS. If the UL channel state between the BS and the UE is good, the UE transmits the UL signal with lower power, thereby reducing interference on the SL UE. Therefore, in this case, the number of available beam candidates may increase when the UL signal is transmitted by setting the threshold 1 to be high.

Instead of explicitly reporting the threshold 1 to the UE, the BS may implicitly report it by reporting Tx power to the UE. In this case, a relation of the threshold 1 and the Tx power of the UE needs to be agreed in advance. In addition, UL Tx power of the UE may consist of signals of several layers, and when the threshold 1 is derived, it may be calculated without considering Tx power information of a physical layer. This is because physical layer UL power control information changes dynamically according to a channel state. Alternatively, the BS may transmit a threshold 1' as a UE common signal while implicitly reporting the threshold 1 through the UL Tx power. Upon receiving this, the UE may generate beam direction information by using a maximum value or a minimum value among the implicitly derived threshold 1 and threshold 1'. Under this operation, a UE which does not receive UL TX power information or which does not receive it for a specific time may select a beam direction candidate by using the threshold 1. Unlike in the aforementioned embodiment, the BS may transmit the threshold 1 as UE common information to reduce a signaling overhead.

Since the BS may fail in decoding of beam information transmitted by the BS, step S1850 is required. Since it is required to prioritize scheduling of the BS in cellular communication, it is necessary to perform scheduling preferentially for UL signal transmission if the BS fails to receive beam restriction information from the UL UE.

Some of steps of FIG. 18 may be omitted.

Although it is shown in FIG. 17 and FIG. 18 that sidelink communication can be performed between the UL UE and the SL UE for convenience of explanation, the SL UE may perform sidelink communication also with another SL UE other than the UL UE.

Figure 19:
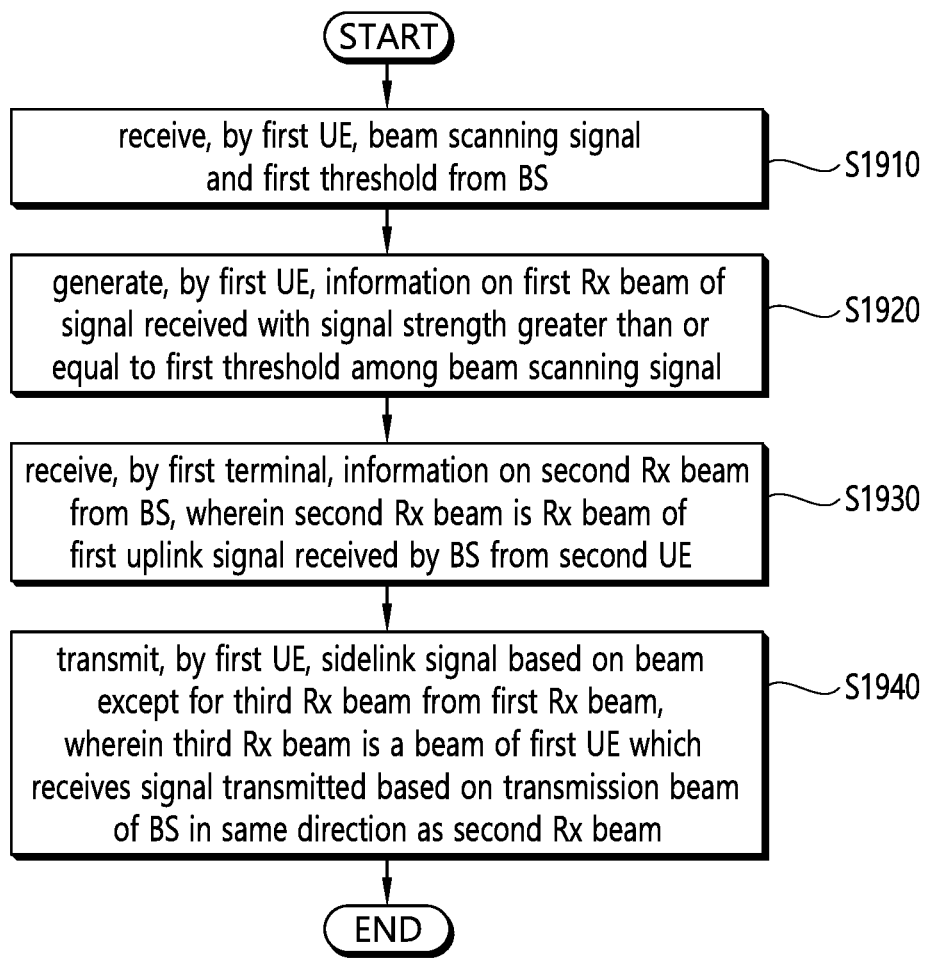
FIG. 19 is a flowchart showing a procedure of performing communication between UEs by sharing an uplink resource and a sidelink resource according to an embodiment of the present specification.

FIG. 19 is a flowchart showing a procedure of performing communication between UEs by sharing an uplink resource and a sidelink resource according to an embodiment of the present specification.

A BS may be configured to share or overlap the entirety or part of a time/frequency resource (e.g., a resource pool) for unicast communication between UEs with a UL time/frequency resource and/or a DL time/frequency resource and/or a time/frequency resource allocated for broadcast or discovery of an SL. To this end, the BS may transmit a cell-common or UE-specific signal for corresponding resource pool allocation as a physical layer signal or a higher layer signal.

An information field for designating a time/frequency resource (resource pool) for unicast communication between UEs as the physical layer or higher layer signal may be configured as follows. For example, the information field may be used for the purpose of designating a time/frequency resource in a subframe or a slot or a mini slot. For another example, the information field may be used for the purpose of designating a time/frequency resource in an SL resource and/or a UL resource and/or a DL resource. Specifically, it may be assumed that a resource pool for unicast communication between UEs can be allocated to both the uplink resource and the sidelink resource, the uplink resource is allocated to OFDM symbols $n_1, n_2, \ldots n_{UL}$ in a subframe, and the sidelink resource is allocated to OFDM symbols $m_1, m_2, \ldots m_{SL}$ in the subframe. In this case, the information field for allocating the resource pool is configured by including all of the OFDM symbols $n_1, \ldots, n_{UL}$ and $m_1, \ldots, m_{SL}$.

A resource may be shared even if a numerology applied to the time/frequency resource for unicast communication between UEs is different from a DL or UL numerology. In this case, the information field for allocating the time/frequency resource for unicast communication between UEs is generated based on the numerology applied to unicast communication between UEs. Herein, the numerology may correspond to various numeric values that can be used in a next-generation wireless communication system aiming at high reliability and low latency. For example, the numerology may be a length (TTI length) of a subframe, a subcarrier spacing, the number of symbols of the subframe, and/or a CP length or the like.

The BS instructs the UE to transmit a reference signal (e.g., sounding reference signal (SRS)) through a UE-specific physical layer or a higher layer signal. The signal may include antenna port information for transmitting the reference signal and/or an indicator indicating a type of channel information transmitted by the BS to the UE at a later time through a downlink control channel, together with a time and/or frequency of reference signal transmission and/or sequence resource information and/or transmission power. Alternatively, the signal may be physical layer signaling, and the channel information indicator may be transmitted as a higher layer indicator. The UE transmits the reference signal to the BS on the basis of signaled information.

However, in the present embodiment, since a characteristic of channel reciprocity in a time division duplex (TDD) system can be used, the UE does not have to transmit a reference signal such as an SRS. If the UE strongly receives a beam A transmitted by the BS in a beam direction n, the channel reciprocity may correspond to a characteristic in which, when the UE transmits a signal by using/based on the beam direction n, the BS also strongly receive a signal in an Rx beam direction A.

In addition, in the present embodiment, a first UE may correspond to an SL UE capable of transmitting a sidelink signal, and a second UE may correspond to a UL UE capable of transmitting an uplink signal. The first UE may transmit/receive the sidelink signal with respect to the second UE. Alternatively, the first UE may transmit/receive the sidelink signal with respect to another SL UE other than the second UE. The uplink resource and the sidelink resource share a time/frequency resource, but may perform communication in a spatially divided manner by using/based on a beam to which a distributed antenna is applied. In this case, the UE may have a plurality of radio units (RUs). The RU may correspond to an antenna port. A beam or a beam group may be configured with the antenna port.

In step S1910, the first UE receives a beam scanning signal and a first threshold from a BS. The beam scanning signal may be included in a synchronization signal block within a synchronization signal burst transmitted periodically by the BS.

In step S1920, the first UE generates information on a first Rx beam of a signal received with signal strength greater than or equal to the first threshold among the beam scanning signals. Since the beam scanning signal is a downlink signal, the information on the first Rx beam may include information on an Rx beam of the first UE which receives the downlink signal. If the downlink signal has signal strength greater than or equal to the first threshold, since it may cause interference on a sidelink signal, the first UE may select a beam which is not used in a sidelink resource through the first threshold.

In step S1930, the first UE receives information on a second Rx beam from the BS. The second Rx beam is an Rx beam of a first uplink signal received by the BS from the second UE.

The sidelink resource overlaps with the uplink resource in time and frequency domains. Accordingly, since the first uplink signal may directly interfere with the sidelink signal, the first UE needs to know information on an Rx beam of the BS which receives the first uplink signal. That is, information on the second Rx beam may include information on the Rx beam of the BS which receives the first uplink signal.

In step S1940, the first UE transmits a sidelink signal by using/based on a beam except for a third Rx beam from the first Rx beam. The third Rx beam is a beam of the first UE which receives a signal transmitted by using/based on a transmission beam of the BS in the same direction as the second Rx beam. Herein, the transmission beam of the BS in the same direction as the second Rx beam may have a beam width different from that of the second Rx beam, and a directing point of the beam may have some errors. Since the first UE may know a beam which may cause interference between an uplink and a sidelink through information on the first Rx beam and information on the second Rx beam, a sidelink signal may be transmitted by using/based on a beam except for a corresponding beam. Accordingly, the use of the beam which may cause interference between the uplink and the sidelink may be limited.

In addition, the first UE may receive a second threshold from the BS. When the first UE applies the second threshold, the number of beams used to transmit the sidelink may increase if an uplink channel state is good. For example, the first UE may retain a beam having signal strength greater than or equal to the first threshold as a candidate beam, and may use the beam when transmitting the sidelink signal since it is considered that a beam having signal strength less than or equal to the second threshold does not have great effect on interference among the candidate beams. In other words, the sidelink signal may be transmitted by using/based on a beam of a signal received with signal strength greater than or equal to the first threshold and a beam of a signal received with signal strength less than or equal to the second threshold. In this case, the second threshold may be set to be greater than or equal to the first threshold.

In addition, when the BS receives a second uplink signal from a third UE by using/based on a fourth Rx beam, the second threshold may be set according to each of a direction of the second Rx beam and a direction of the fourth Rx beam. Also in this case, a beam having signal strength less than or equal to a smaller threshold between the second threshold corresponding to an Rx beam direction of the first uplink signal and the second threshold corresponding to an Rx beam direction of the second uplink signal may be used when the first UE transmits the side link signal. The first uplink signal and the second uplink signal may be transmitted through the uplink resource.

The first threshold may be received through radio resource control (RRC) signaling. The second threshold may be received through a common control signal. The common control signal may be a common physical control signal transmitted on a common PDCCH or PDSCH.

Information on the first Rx beam may include information on a time index of a time of receiving a signal received with signal strength greater than or equal to the first threshold, an antenna port of receiving the signal received with the signal strength greater than or equal to the first threshold, or a direction of the first Rx beam.

A direction of the first Rx beam may be indicated with the time index in a downlink resource. In new RAT (NR), a direction of a beam may be identified with the time index. In this case, the first uplink signal may be received by using/based on an Rx beam indicated (or mapped) with the time index in the uplink resource. In addition, the second uplink signal may also be received by using/based on an Rx beam indicated (or mapped) with the time index in the uplink resource.

The sidelink signal may be transmitted in a unicast or multicast manner. A broadcast or discovery signal between UEs requires a dedicated resource. However, since a unicast signal between UEs is transmitted aperiodically when traffic occurs in the UE, a sidelink resource overlaps with an uplink resource, thereby reducing resource consumption.

Figure 20:
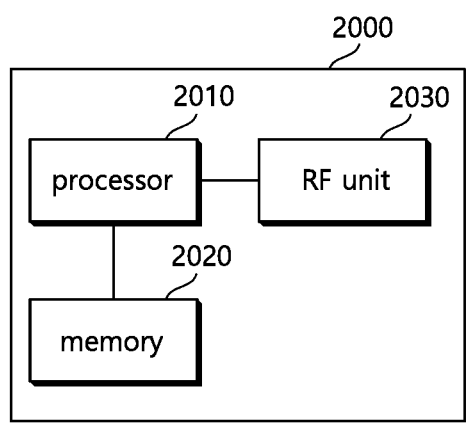
FIG. 20 is a block diagram showing an apparatus for wireless communication for implementing an embodiment of the present specification.

FIG. 20 is a block diagram showing an apparatus for wireless communication for implementing an embodiment of the present specification.

An apparatus 2000 for wireless communication includes a processor 2010, a memory 2020 and a radio frequency (RF) unit 2030.

The processor 2010 may be configured to implement proposed functions, procedures and/or methods described in this description. Layers of the radio interface protocol may be implemented in the processor 2010. The processor 2010 may handle a procedure explained above. The memory 2020 is operatively coupled with the processor 2010, and the RF unit 2030 is operatively coupled with the processor 2010.

The processor 2010 may include application-specific integrated circuit (ASIC), other chipset, logic circuit and/or data processing device. The memory 2020 may include read-only memory (ROM), random access memory (RAM), flash memory, memory card, storage medium and/or other storage device. The RF unit 2030 may include baseband circuitry to process radio frequency signals. When the embodiments are implemented in software, the techniques described herein can be implemented with modules (e.g., procedures, functions, and so on) that perform the functions described herein. The modules can be stored in memory 2020 and executed by processor 2010. The memory 2020 can be implemented within the processor 2010 or external to the processor 2010 in which case those can be communicatively coupled to the processor 2010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of performing communication between terminals by sharing an uplink resource and a sidelink resource in a wireless communication system, the method comprising:
   receiving, by a first terminal, a beam scanning signal and a first threshold from a base station;
   generating, by the first terminal, information on a first reception beam of a signal received with signal strength greater than or equal to the first threshold among the beam scanning signals;
   receiving, by the first terminal, information on a second reception beam from the base station, wherein the second reception beam is a reception beam of a first uplink signal received by the base station from a second terminal;
   transmitting, by the first terminal, a sidelink signal by using a beam except for a third reception beam from the first reception beam, wherein the third reception beam is a beam of the first terminal which receives a signal transmitted based on a transmission beam of the base station,
   wherein a directing point of the transmission beam of the base station is same as a directing point of the second reception beam, and
   wherein the sidelink resource overlaps with the uplink resource in time and frequency domains; and
   receiving, by the first terminal, a second threshold from the base station,
   wherein the sidelink signal is transmitted based on a beam of a signal received with signal strength greater than or equal to the first threshold and a beam of a signal received with signal strength less than or equal to the second threshold, and
   wherein the second threshold is set to be greater than or equal to the first threshold.

2. The method of claim 1, wherein if the base station receives a second uplink signal from a third terminal based on a fourth reception beam, the second threshold is set according to each of a direction of the second reception beam and a direction of the fourth reception beam, and the first uplink signal and the second uplink signal are transmitted through the uplink resource.

3. The method of claim 1,
   wherein the first threshold is received through radio resource control (RRC) signaling, and
   wherein the second threshold is received through a common control signal.

4. The method of claim 1,
   wherein information on the first reception beam includes information on a time index of a time of receiving a signal received with signal strength greater than or equal to the first threshold, an antenna port of receiving the signal received with the signal strength greater than or equal to the first threshold, or a direction of the first reception beam, and
   wherein the direction of the first reception beam is indicated with the time index in a downlink resource.

5. The method of claim 4, wherein the first uplink signal is received based on a reception beam indicated with the time index in the uplink resource.

6. The method of claim 1, wherein the beam scanning signal is included in a synchronization signal block within a synchronization signal burst periodically transmitted by the base station.

7. The method of claim 1, wherein the sidelink signal is transmitted in a unicast manner.

8. A first terminal for performing communication between terminals by sharing an uplink resource and a sidelink resource in a wireless communication system, the first terminal comprising:
   a radio frequency (RF) unit transmitting and receiving a radio signal; and
   a processor operatively coupled with the RF unit, wherein the processor is configured to:
   receive a beam scanning signal and a first threshold from a base station;
   generate information on a first reception beam of a signal received with signal strength greater than or equal to the first threshold among the beam scanning signals;
   receive information on a second reception beam from the base station, wherein the second reception beam is a reception beam of a first uplink signal received by the base station from a second terminal;
   transmit a sidelink signal by using a beam except for a third reception beam from the first reception beam, wherein the third reception beam is a beam of the first terminal which receives a signal transmitted based on a transmission beam of the base station,
   wherein a directing point of the transmission beam of the base station is same as a directing point of the second reception beam, and
   wherein the sidelink resource overlaps with the uplink resource in time and frequency domains; and
   receive a second threshold from the base station,
   wherein the sidelink signal is transmitted based on a beam of a signal received with signal strength greater than or equal to the first threshold and a beam of a signal received with signal strength less than or equal to the second threshold, and
   wherein the second threshold is set to be greater than or equal to the first threshold.

9. The first terminal of claim 8, wherein if the base station receives a second uplink signal from a third terminal based on a fourth reception beam, the second threshold is set according to each of a direction of the second reception beam and a direction of the fourth reception beam, and the first uplink signal and the second uplink signal are transmitted through the uplink resource.

10. The first terminal of claim 8,
    wherein the first threshold is received through radio resource control (RRC) signaling, and
    wherein the second threshold is received through a common control signal.

11. The first terminal of claim 8,
    wherein information on the first reception beam includes information on a time index of a time of receiving a signal received with signal strength greater than or equal to the first threshold, an antenna port of receiving the signal received with the signal strength greater than or equal to the first threshold, or a direction of the first reception beam, and wherein the direction of the first reception beam is indicated with the time index in a downlink resource.

12. The first terminal of claim 11, wherein the first uplink signal is received based on a reception beam indicated with the time index in the uplink resource.

13. The first terminal of claim 8, wherein the beam scanning signal is included in a synchronization signal block within a synchronization signal burst periodically transmitted by the base station.

14. The first terminal of claim 8, wherein the sidelink signal is transmitted in a unicast manner.

* * * * *